(12) United States Patent
Jung et al.

(10) Patent No.: US 12,501,158 B2
(45) Date of Patent: Dec. 16, 2025

(54) METHOD OF IMAGE STABILIZATION AND ELECTRONIC DEVICE PERFORMING THE SAME

(71) Applicant: Samsung Electronics Co., Ltd., Suwon-si (KR)

(72) Inventors: Hyeyun Jung, Suwon-si (KR); Joonyeon Kim, Suwon-si (KR); Daeho Lee, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 175 days.

(21) Appl. No.: 18/543,527

(22) Filed: Dec. 18, 2023

(65) Prior Publication Data

US 2024/0284048 A1 Aug. 22, 2024

(30) Foreign Application Priority Data

Feb. 22, 2023 (KR) .......................... 10-2023-0023760

(51) Int. Cl.
*H04N 23/68* (2023.01)
*H04N 23/80* (2023.01)

(52) U.S. Cl.
CPC ....... *H04N 23/683* (2023.01); *H04N 23/6812* (2023.01); *H04N 23/815* (2023.01)

(58) Field of Classification Search
CPC ............... H04N 23/683; H04N 23/815; H04N 23/6811; H04N 23/6812
USPC ...................................................... 348/208.2
See application file for complete search history.

(56) References Cited

U.S. PATENT DOCUMENTS

| 8,493,454 B1* | 7/2013 | Kohn ................ H04N 23/6815 |
| | | 348/208.4 |
| 9,055,222 B2 | 6/2015 | Lin et al. |
| 9,258,485 B2* | 2/2016 | Wang ..................... G06T 11/60 |
| 9,305,362 B1* | 4/2016 | Szedo ............... H04N 23/6811 |
| 9,319,587 B2 | 4/2016 | Takao et al. |

(Continued)

FOREIGN PATENT DOCUMENTS

WO 2021/218694 A1 11/2021

OTHER PUBLICATIONS

Extended European Search Report dated Jul. 12, 2024 for corresponding European Application No. 24157095.1.

*Primary Examiner* — Pritham D Prabhakher
(74) *Attorney, Agent, or Firm* — Harness, Dickey & Pierce, P.L.C.

(57) ABSTRACT

An electronic device includes a motion sensor, an image signal processor core, an image stabilizer, and an image size controller. The motion sensor generates camera motion data by sensing motion of a camera module that captures an image to generate an original frame image. The image signal processor core generates processed frame image by processing input frame image corresponding to the original frame image. The image stabilizer generates an output frame image by performing electronic image stabilization of the processed frame image. The image size controller estimates a motion level indicating a degree of camera motion of the camera module based on the camera motion data and control a size of the input frame image or a size of the output frame image based on the motion level. The image stabilization is efficiently performed by estimating camera motion and adjusting the image size according to the camera motion.

18 Claims, 18 Drawing Sheets

(56) References Cited

U.S. PATENT DOCUMENTS

| | | | |
|---|---|---|---|
| 10,404,916 B2 | 9/2019 | Parkkila et al. | |
| 10,623,643 B2 | 4/2020 | Miyahara | |
| 10,931,875 B2* | 2/2021 | Satoh | H04N 23/6842 |
| 11,363,201 B2 | 6/2022 | Nyström et al. | |
| 11,445,113 B2 | 9/2022 | Kimura | |
| 11,778,322 B2* | 10/2023 | Chen | H04N 23/6845 |
| | | | 348/208.4 |
| 12,101,575 B2* | 9/2024 | Horovitz | H04N 5/2628 |
| 2011/0243532 A1* | 10/2011 | Bostaph | H04N 23/6812 |
| | | | 386/278 |
| 2014/0300765 A1* | 10/2014 | Takao | H04N 23/6842 |
| | | | 348/208.1 |
| 2015/0206317 A1* | 7/2015 | Baek | H04N 23/63 |
| | | | 345/625 |
| 2015/0271411 A1* | 9/2015 | Wang | H04N 23/63 |
| | | | 348/241 |
| 2017/0041545 A1* | 2/2017 | Murgia | H04N 23/6812 |
| 2019/0028645 A1* | 1/2019 | Satoh | H04N 23/61 |
| 2022/0053134 A1* | 2/2022 | Chen | H04N 23/683 |
| 2022/0108541 A1* | 4/2022 | Ozone | H04N 23/683 |
| 2022/0286611 A1 | 9/2022 | Tsairi et al. | |
| 2022/0385816 A1 | 12/2022 | Jung et al. | |
| 2023/0336683 A1* | 10/2023 | Horovitz | H04N 23/667 |
| 2024/0305886 A1* | 9/2024 | Tayanaka | H04N 23/687 |

\* cited by examiner

METHOD OF IMAGE STABILIZATION AND ELECTRONIC DEVICE PERFORMING THE SAME

CROSS-REFERENCE TO RELATED APPLICATION

This U.S. non-provisional application claims priority under 35 USC § 119 to Korean Patent Application No. 10-2023-0023760, filed on Feb. 22, 2023, in the Korean Intellectual Property Office (KIPO), the disclosure of which is incorporated by reference herein in its entirety.

BACKGROUND

1. Technical Field

Example embodiments relate generally to image processing, and more particularly to methods of image stabilization and an electronic devices performing the method of image stabilization.

2. Discussion of the Related Art

A distorted image may be obtained by a problem such as shaking of a camera module caused by a user's hand shake while an electronic device including the camera module captures the image. To compensate for the shake problem of the camera module, the electronic device may perform image correction. The image correction may include, for example, optical image stabilization (OIS) correction or electronic image stabilization (EIS) or digital image stabilization (DIS) correction.

The OIS correction may refer to correction in which, when shaking of the electronic device occurs while the camera module acquires an image, the image stabilizer moves a lens or an image sensor in a direction to compensate for the shaking of the electronic device. There are two types of OIS correction: a shift method that moves in a plane and a tilt method that rotates. In addition, each OIS correction may include, for example, a lens moving method or a sensor moving method, that is, the OIS correction may represent 2D translation.

The EIS correction may refer to an operation in which the electronic device corrects an image based on at least one of image motion and camera motion. Image motion may refer to information indicating motion of an object (e.g., a feature point of a captured object) within a frame image. The electronic device may determine image motion by comparing frame images acquired through the camera module. The camera motion data may refer to information corresponding to shaking of the electronic device including the camera module. The camera motion data may be obtained through a motion sensor such as a gyro sensor or an accelerometer. That is, the camera motion data may represent 3D motion. Power consumption of the electronic device increases due to this EIS correction. In addition, since the EIS correction is accompanied by image cropping, loss of field of view (FOV) may occur.

SUMMARY

Some example embodiments may provide methods of image stabilization and electronic devices performing the method of image stabilization, capable of efficiently providing a stabilized image.

According to example embodiments, an electronic device includes a motion sensor, an image signal processor core, an image stabilizer and an image size controller. The motion sensor generates camera motion data by sensing a motion of a camera module that captures an image to generate an original frame image. The image signal processor core generates processed frame image by processing input frame image corresponding to the original frame image. The image stabilizer generates an output frame image by performing electronic image stabilization (EIS) of the processed frame image. The image size controller estimates a motion level indicating a degree of camera motion of the camera module based on the camera motion data and control a size of the input frame image or a size of the output frame image based on the motion level.

According to example embodiments, a method of image stabilization includes generating camera motion data by sensing a motion of a camera module that captures an image to generate an original frame image, generating processed frame image by processing input frame image corresponding to the original frame image, generating an output frame image by performing electronic image stabilization (EIS) of the processed frame image, estimating a motion level indicating a degree of camera motion of the camera module based on the camera motion data, and controlling a size of the input frame image or a size of the output frame image based on the motion level.

According to example embodiments, a method of image stabilization includes estimating a motion level indicating a degree of camera motion of a camera module based on camera motion data generated by a motion sensor, where the camera module captures an image to generate an original frame image, and controlling, based on the motion level, a size of an input frame image that is input to an image signal processor core or a size of an output frame image that is generated by electronic image stabilization (EIS).

The method of image stabilization and the electronic device according to example embodiments may efficiently perform image stabilization and reduce power consumption by estimating camera motion and adjusting the size of an image according to the camera motion. In addition, the method of image stabilization and the electronic device according to example embodiments may reduce the loss of the field of view by reducing the crop margin according to the degree of camera motion.

BRIEF DESCRIPTION OF THE DRAWINGS

Example embodiments of the present disclosure will be more clearly understood from the following detailed description taken in conjunction with the accompanying drawings.

DETAILED DESCRIPTION OF THE EMBODIMENTS

Figure 1:
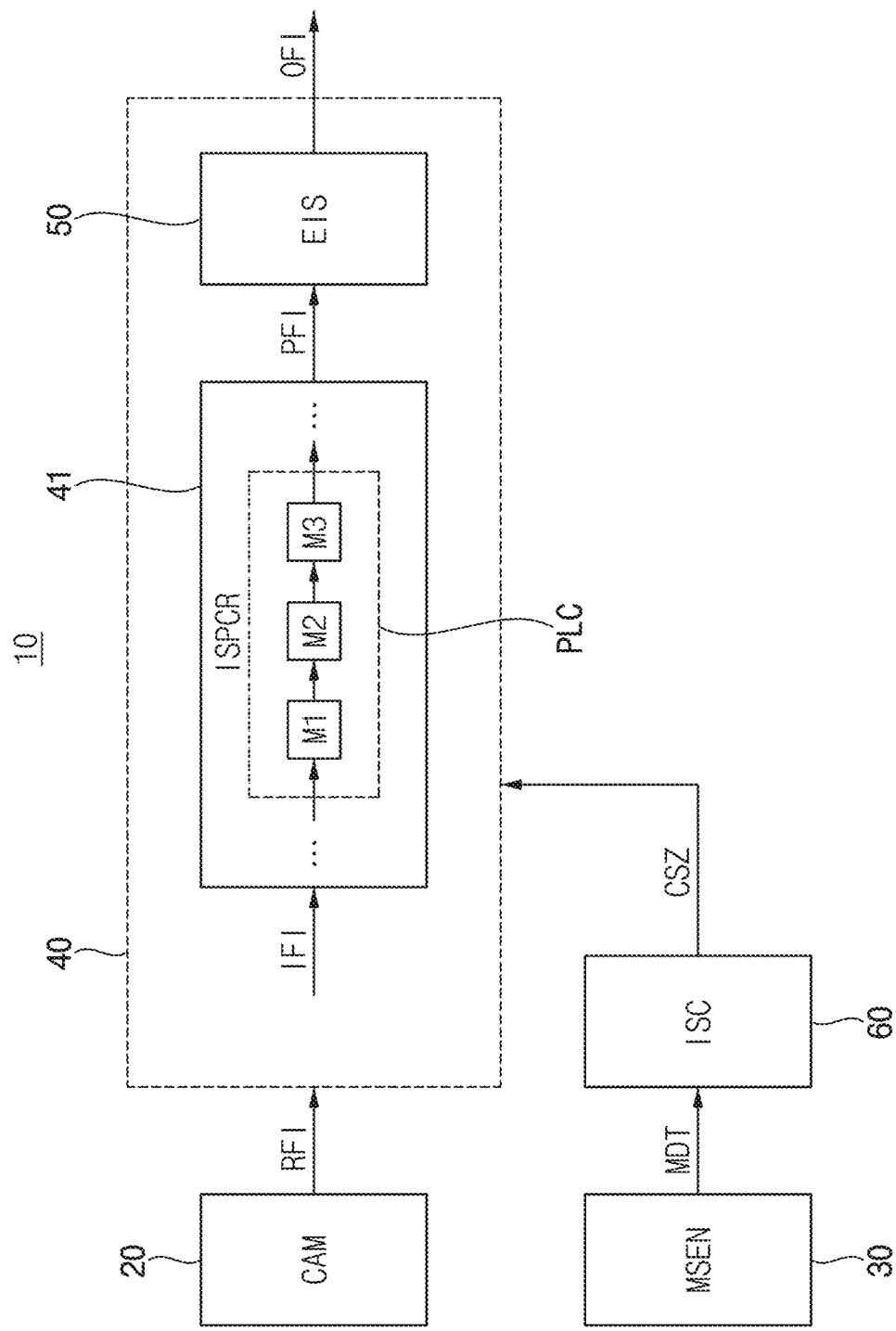
FIG. 1 is a block diagram illustrating an electronic device according to example embodiments.

Various example embodiments will be described more fully hereinafter with reference to the accompanying drawings, in which some example embodiments are shown. In the drawings, like numerals refer to like elements throughout. The repeated descriptions may be omitted.

Figure 2:
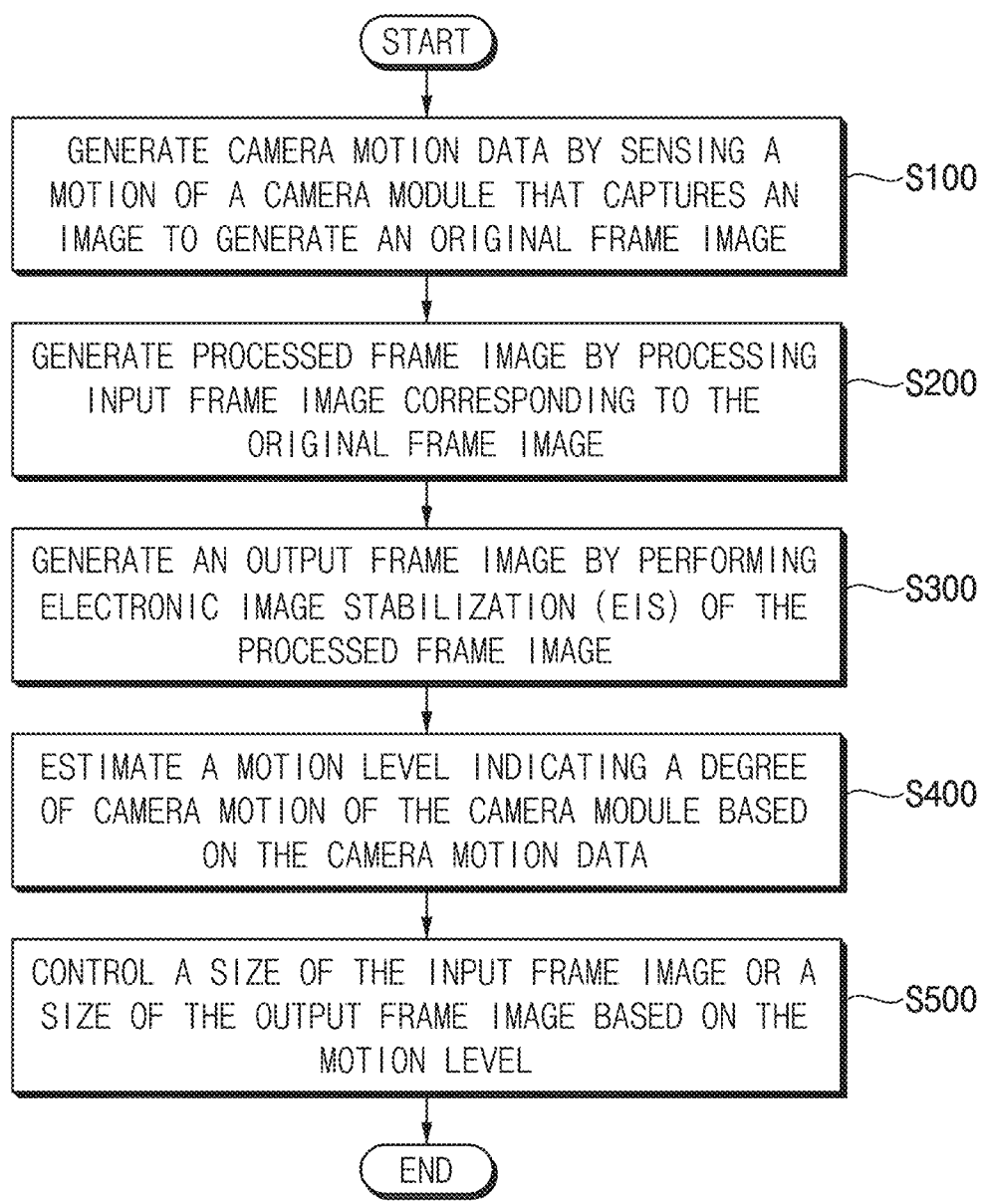
FIG. 2 is a flow chart illustrating a method of image stabilization according to example embodiments.

FIG. 1 is a block diagram illustrating an electronic device according to example embodiments, and FIG. 2 is a flow chart illustrating a method of image stabilization according to example embodiments.

Referring to FIG. 1, an electronic device 10 may include a camera module (CAM) 20, a motion sensor (MSEN) 30, an image signal processor 40, an image stabilizer 50, and an image size controller (ISC) 60. Although the motion sensor 30 is shown as a separate structure from the camera module 20 in FIG. 1, the motion sensor 30 may be included in the camera module 20. In addition, although the image stabilizer 50 is included in the image signal processor 40 in FIG. 1, the image stabilizer 50 may be implemented as a separate structure from the image signal processor 40.

Referring to FIGS. 1 and 2, the camera module 20 may generate an original frame image RFI by capturing an image. The motion sensor 30 may generate camera motion data MDT by sensing a motion of the camera module 20 (S100). The camera module 20 and the motion sensor 30 will be described below with reference to FIG. 3.

The image signal processor 40 may include at least one image signal processor core 41. The image signal processor core 41 may generate a processed frame image PFI by processing the input frame image IFI corresponding to the original frame image RFI (S200).

The image signal processor core 41 may include at least one pipeline circuit PLC including a plurality of processing modules M1, M2 and M3 connected in series for sequential processing of data lines of the received input frame image IFI.

The pipeline circuit PLC may divide a process for one data line into several sub-processes, and the plurality of processing modules M1, M2 and M3 each having different functions may be in charge of the sub-processes. The processing result performed in each processing module may be successively transferred to a next processing module, and a final pipeline processing result may be output from the last processing module. The plurality of processing modules M1, M2 and M3 may overlap the sub-processes for several input data lines that are sequentially input the pipeline circuit PLC. Accordingly the overall processing time for the data lines may be shortened using such pipeline scheme.

The image stabilizer 50 may generate an output frame image OFI by performing electronic image stabilization (EIS) of the processed frame image PFI (S300). The EIS will be described below with reference to FIG. 20.

The image size controller 60 may estimate a motion level indicating a degree of camera motion of the camera module 20 based on the camera motion data MDT (S400). Also, the image size controller 60 may control a size of the input frame image IFI or a size of output frame image OFI based on the motion level. In some example embodiments, the image size controller 60 may generate a size control signal CSZ including the size control information and control the image signal processor 40 using the size control signal CSZ (S500).

In some example embodiments, as will be described below with reference to FIGS. 10 through 15B, the image size controller 60 may reduce the size of the input frame image when the motion level is smaller than a threshold value. The image stabilization method and the electronic device 10 performing the image stabilization method according to example embodiments may reduce power consumption by reducing the size of the input frame image depending on the degree of camera motion (or camera motion). In some example embodiments, an unnecessary operation may not be performed on an area of an image frame based on a detected level of motion, and thus, unnecessary power consumption may be prevented or reduced. For example, according to some example embodiments, there may be an increase in accuracy of image stabilization, power consumption, and improved field of view based on the above methods. Therefore, the improved devices and methods overcome the deficiencies of the conventional devices and methods to motion resolution, field of view, and noise removal while reducing resource consumption and increasing data clarity. For example, by using the disclosed methods, the electronic device 10 may require fewer resources, such as memory access and/or power to drive circuitry to produce an image (e.g., an input frame image IFI and/or an output frame image OFI). Additionally, based on an increased size of an output frame image OFI, a clearer and more detailed image may be generated based on the improved field of view. Furthermore, the electronic device 10 according to example embodiments may have improved resource usage as discussed above based on a level of detected movement.

In some example embodiments, as will be described below with reference to FIGS. 16 through 19, the image size controller 60 may reduce a crop margin of the EIS performed by the image stabilizer 50. The image stabilization method according to example embodiments and the electronic device 10 performing the image stabilization method may reduce loss of a field of view (FOV) by reducing the crop margin depending on the degree of camera motion.

In this disclosure, the camera module may include an image sensor, and the camera motion data may include frame motion data. According to example embodiments, an image size may be adjusted based on the motion level of a final image to which the OIS compensation is reflected.

Figure 3:
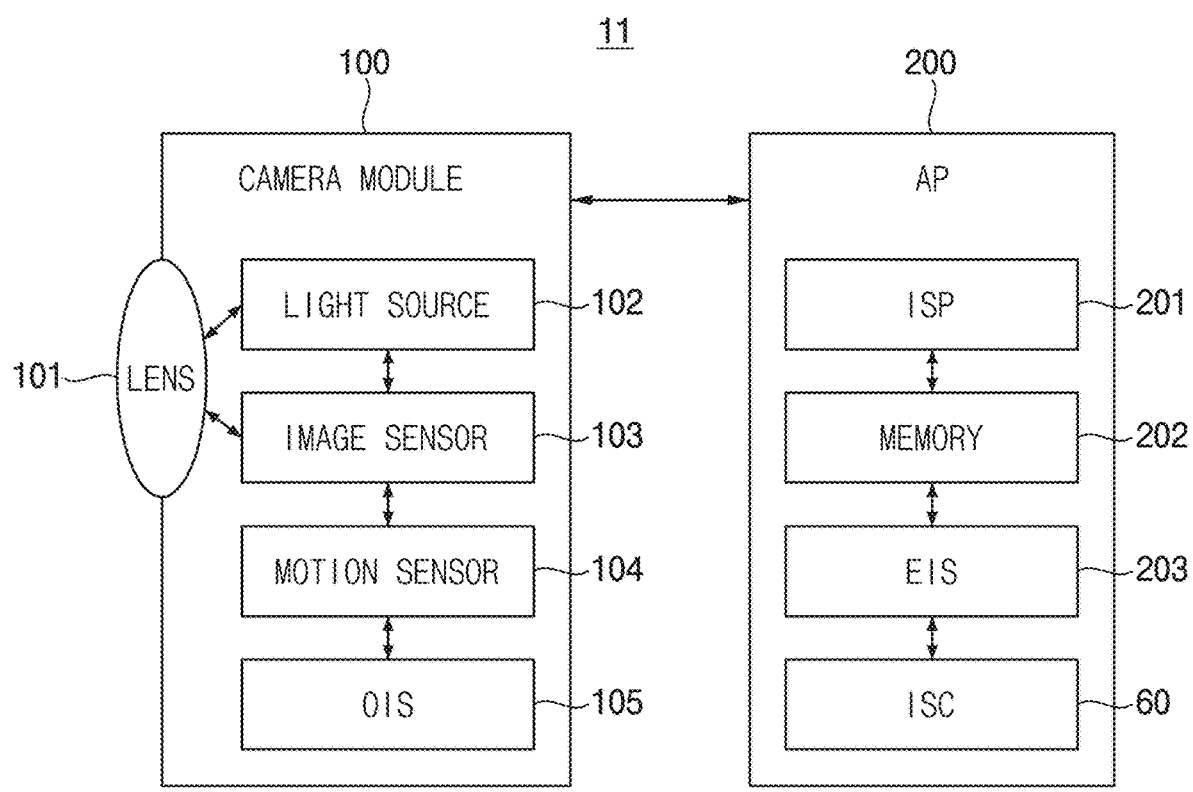
FIG. 3 is a block diagram illustrating an electronic device according to example embodiments.

FIG. 3 is a block diagram illustrating an electronic device according to example embodiments.

Referring to FIG. 3, an electronic device 11 may include a camera module 100 and an application processor (AP) 200.

The camera module 100 may include a lens assembly 101, a light source 102, an image sensor 103, a motion sensor 104, and an OIS controller 105. The application processor 200 may include an image signal processor 201, a memory 202 (e.g., a buffer memory), an image stabilizer (EIS) 203, and an image size controller (ISC) 60.

The lens assembly 101 may collect light emitted from an object that is an image capturing target. The lens assembly 101 may include one or more lenses. According to some example embodiments, the camera module 100 may include a plurality of lens assemblies 101. In this case, the camera module 100 may be, for example, a dual camera, a 360-degree camera, or a spherical camera. The plurality of lens assemblies 101 may have the same lens properties (e.g., field of view, focal length, auto focus, f number, or optical zoom), or at least one lens assembly may have at least one lens property different from another lens assembly. For example, the lens assembly 101 may include a wide-angle lens or a telephoto lens.

The light source 102 may emit light used to enhance light emitted from an object to be captured. The light source 102 may include one or more light emitting diodes (for example, a red-green-blue (RGB) LED, a white LED, an infrared LED, an ultraviolet LED, or a xenon lamp.

The image sensor 103 may obtain an image corresponding to the object by converting light transmitted from the object through the lens assembly 101 into an electrical signal. The image sensor 103 may include one image sensor selected from image sensors having different properties such as an RGB sensor, a black and white (BW) sensor, an IR sensor, or a UV sensor, a plurality of image sensors having different properties, or a plurality of image sensors having the same properties. Each image sensor included in the image sensor 103 may be implemented as, for example, a charged coupled device (CCD) sensor or a complementary metal oxide semiconductor (CMOS) sensor.

The OIS controller 105 may respond to the motion or movement of the camera module 100 or the electronic device 11 including the camera module 100 such that at least one lens or image sensor 103 included in the assembly 101 may be moved in a specific direction or controlled, to at least partially compensate for the negative effect (e.g., image shaking) caused by the motion on the captured image. According to example embodiments, the OIS controller 105 may be implemented as, for example, an optical image stabilizer, and may sense the motion using a gyro sensor, an acceleration sensor, a magnetometer, etc., which are disposed inside or outside the camera module 100.

The image signal processor 201 may perform image processing (e.g., depth map generation, 3D modeling, panorama generation, feature point extraction, image synthesis), and/or image compensation (e.g., noise reduction, resolution adjustment, brightness adjustment, blurring, sharpening, or softening). In addition, the image signal processor 201 may provide information to control at least one component included in the camera module 100 such as exposure time control, read-out timing control, etc. The final image processed by the image signal processor 201 may be stored back in the memory 202 for further processing or being transferred to an external component of the camera module 100.

According to example embodiments, the image signal processor 201 may be configured as at least a portion of the application processor 200, or may be configured as a separate processor that operates independently of the application processor 200. Final images processed by the image signal processor 201 may be displayed on a display device as they are or after additional image processing by the application processor 200.

The memory 202 may at least temporarily store at least a portion of an image acquired through the image sensor 103 for a next image processing task. For example, when image acquisition is delayed according to the shutter, or when a plurality of images are acquired at high speed, the acquired raw or line image (e.g., high resolution image) may be stored in the memory 202, while a corresponding copy image (e.g., a low resolution image) may be previewed through the display device. Thereafter, when a specified condition is satisfied (e.g., a user input or a system command), at least a portion of the original image stored in the memory 202 may be acquired and processed by the image signal processor 201.

In some example embodiments, the electronic device 11 may include two or more camera modules 100 each having different properties or functions. In this case, for example, at least one camera module 100 may be a wide-angle camera or a front camera, and at least one other camera module may be a telephoto camera or a rear camera.

As described above with reference to FIGS. 1 and 2, the image size controller 60 may estimate the motion level indicating the degree of camera motion of the camera module 100 based on camera motion data provided from the motion sensor 104. Also, the image size controller 60 may control, based on the motion level, the size of the input frame image that is input to the image signal processor core or the size of the output frame image output from the image stabilizer 203.

Figure 4:
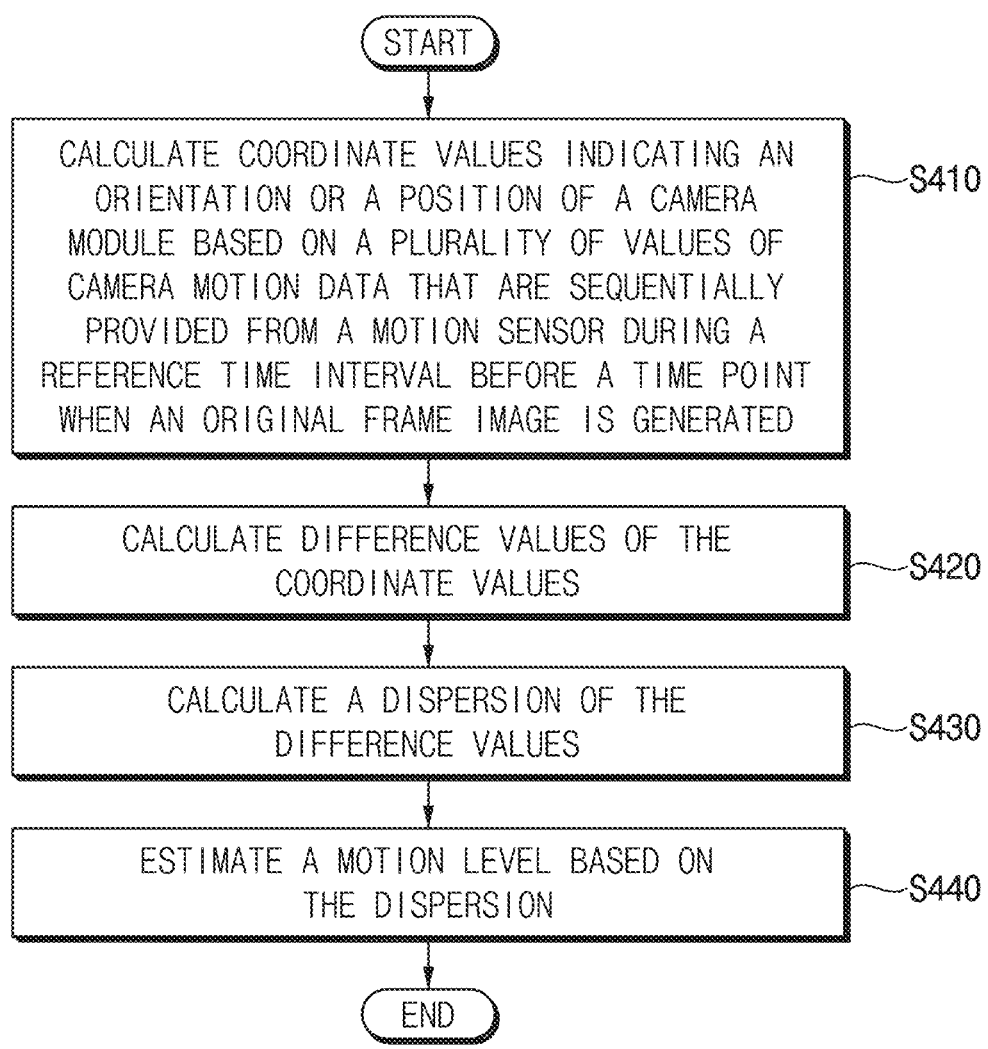
FIG. 4 is a flowchart illustrating some example embodiments of estimating a motion level in a method of image stabilization according to example embodiments.

FIG. 4 is a flowchart illustrating some example embodiments of estimating a motion level in a method of image stabilization according to example embodiments.

Referring to FIGS. 1 and 4, the image size controller 60 may calculate coordinate values indicating an orientation or a position of the camera module 20 based on a plurality of values of the camera motion data MDT that are sequentially provided from the motion sensor 30 during a reference time interval before a time point when the original frame image RFI is generated (S410). The image size controller 60 may calculate difference values of the coordinate values (S420), and calculate a dispersion of the difference values (S430). Finally, the image size controller 60 may estimate the motion level based on the dispersion (S440).

Hereinafter, the method of FIG. 4 will be described in more detail with reference to FIGS. 5 through 9.

Figure 5:
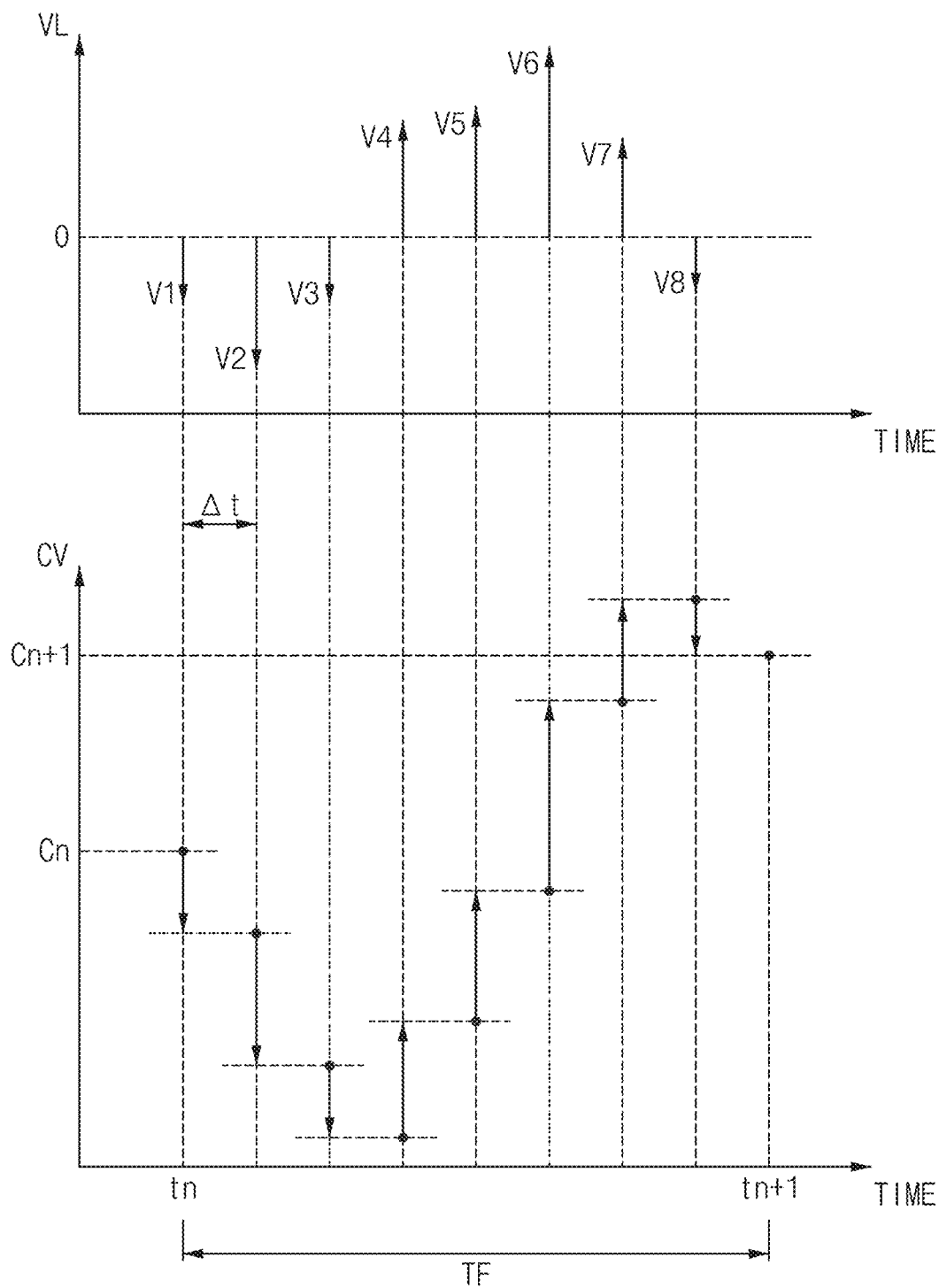
FIG. 5 is a diagram illustrating calculation of coordinate values based on camera motion data in the motion level estimation of FIG. 4.

FIG. 5 is a diagram illustrating calculation of coordinate values based on camera motion data in the motion level estimation of FIG. 4.

FIG. 5 illustrates camera motion data provided from the motion sensor 30 during a frame period TF between a capture time point tn of an n-th original frame image RFI and a capture time point tn+1 of the (n+1)-th original frame image RFI, and a process of calculating coordinate values using the camera motion data. The frame period TF corresponds to the reciprocal of the frame rate. For example, when the frame rate is 30 frames per second (fps), the frame period TF is 1/30 second.

In some example embodiments, as will be described below with reference to FIG. 9, the camera motion data provided from the motion sensor 30 may be three angular velocities provided from the gyro sensor. In this case, a velocity VL shown in FIG. 5 corresponds to one angular velocity among the three angular velocities, and a coordinate CV shown in FIG. 5 may indicate an angle corresponding to the one angular velocity.

For example, during the frame period TF, a plurality of angular velocity values V1 to V8 may be provided from a gyro sensor, and the plurality of angular velocity values V1 to V8 correspond to instantaneous angular velocity at each time point. If the time interval between successive time points is Δt, the amount of change (for example, displacement) di of the angle CV corresponding to the angular velocity Vi (i=1 to 8) may be represented as in Expression 1.

$$di = Vi \cdot \Delta t \qquad \text{Expression 1}$$

Using these displacements di, the coordinate value Cn+1 at the capture time point tn+1 of the (n+1)-th original frame image RFI may be obtained as shown in Expression 2.

$$Cn+1 = Cn + \sum_{i \in TP} di \qquad \text{Expression 2}$$

In Expression 2, Cn represents a coordinate value at the capture time point tn of the n-th original frame image RFI.

FIGS. 6A, 6B, 7A and 7B are diagrams illustrating calculation of difference values of coordinate values in the motion level estimation of FIG. 4.

Figure 6A:
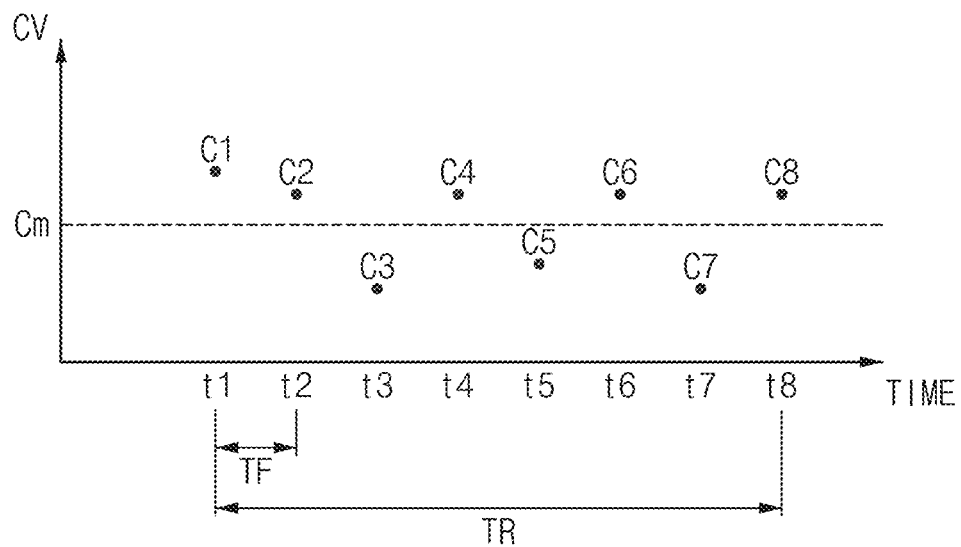
FIGS. 6A, 6B, 7A and 7B are diagrams illustrating calculation of difference values of coordinate values in the motion level estimation of FIG. 4.

FIG. 6A illustrates a plurality of coordinate values C1 to C8 for one coordinate CV obtained by the method described with reference to FIG. 5. FIG. 6A shows a case in which the coordinate values C1 to C8 fluctuate due to unintentional hand shaking in a state in which the camera module is assumed to be fixed at the average coordinate value Cm.

In FIG. 6A, time points t1 to t8 correspond to capture time points of temporally successive original frame images RFI. FIG. 6A illustrates an example in which a reference time interval TR corresponds to seven frame periods TF for convenience of illustration and description, but example embodiments are not limited thereto. The reference time interval TR may be determined as an appropriate value according to characteristics of a camera module, an image capturing environment, and the like. The motion level estimated based on the camera motion data during the reference time interval TR may be a criterion for adjusting the sizes of the input frame image IFI and the output frame image OFI corresponding to the original frame image RFI captured at or after the end of the reference time interval TR.

Figure 6B:
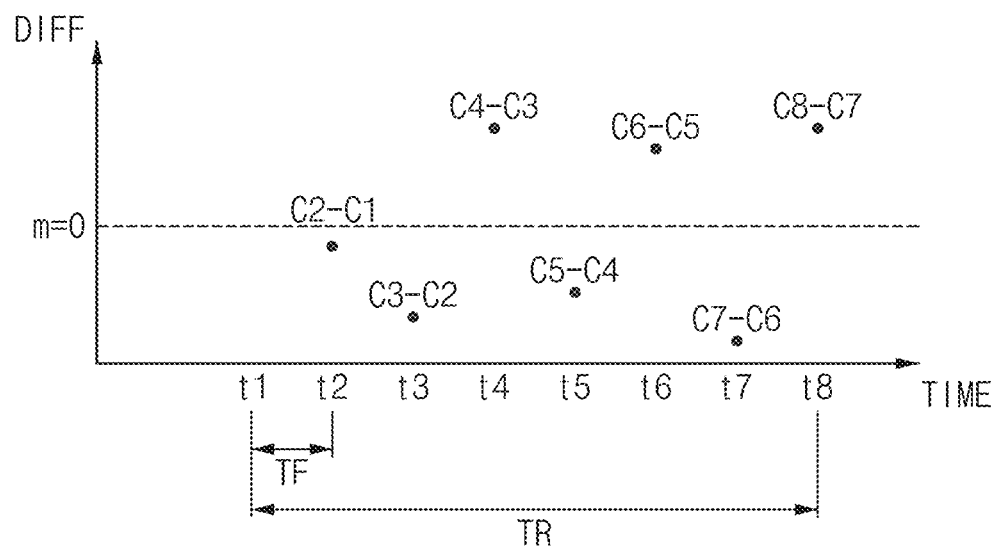

FIG. 6B illustrates the variance DIFF corresponding to the coordinates CV of FIG. 6A, that is, the difference values corresponding to the coordinate values C1 to C8. Each difference value Di (i=1 to 7) corresponds to the difference between two temporally consecutive coordinate values Ci+1 and Ci and may be represented as in Expression 3.

$$Di = (Ci+1) - (Ci) \qquad \text{Expression 3}$$

As shown in FIG. 6B, the average m of the difference values Di converges to 0 in a state in which the camera module is fixed to the average coordinate value Cm.

Figure 7A:
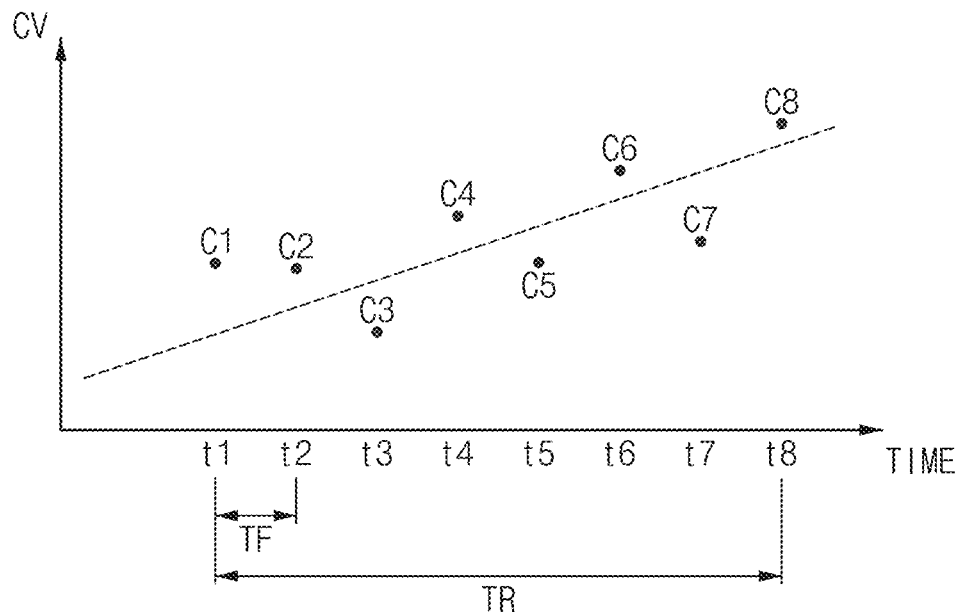
Figure 7B:
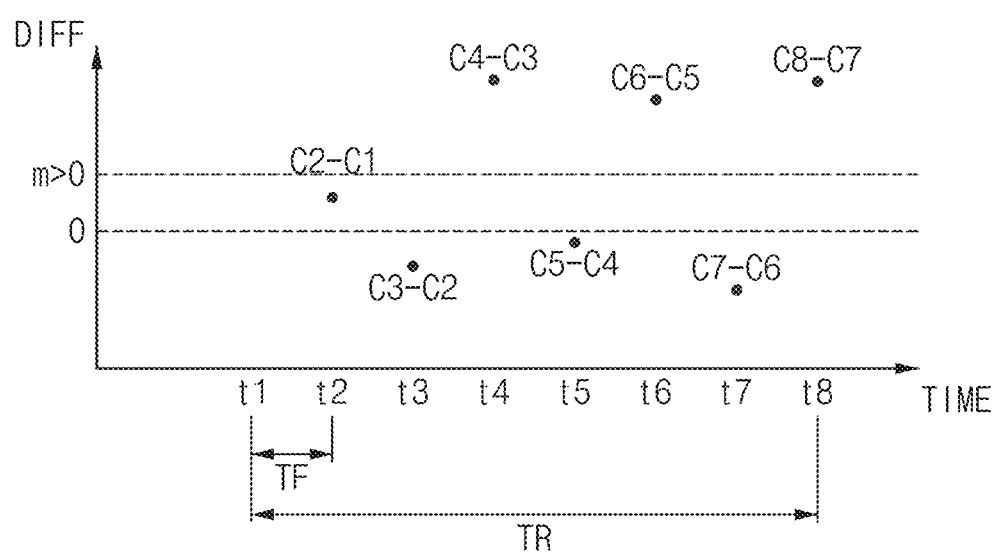

FIG. 7A illustrates a case in which the coordinate values C1 to C8 are fluctuated due to unintentional hand shaking in a state in which the coordinates CV of the camera module are constantly increasing. In this case, as shown in FIG. 7B, the average m of the difference values Di converges to a value greater than zero.

A degree of dispersion of the difference values Di may be calculated, and a motion level indicating a degree of camera motion of the camera module may be estimated based on the degree of dispersion.

Figure 8A:
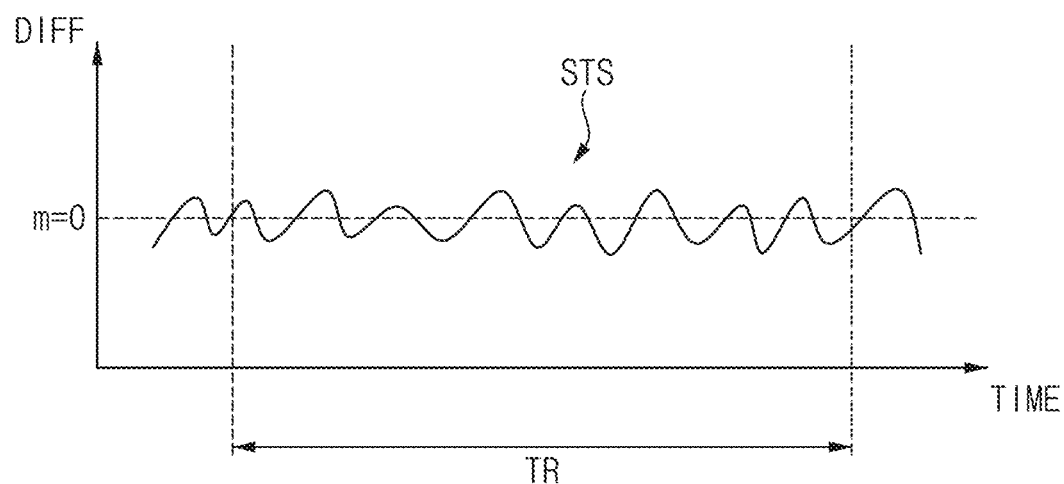
FIGS. 8A and 8B are diagrams illustrating distribution of difference values according to a degree of camera motion.
Figure 8B:
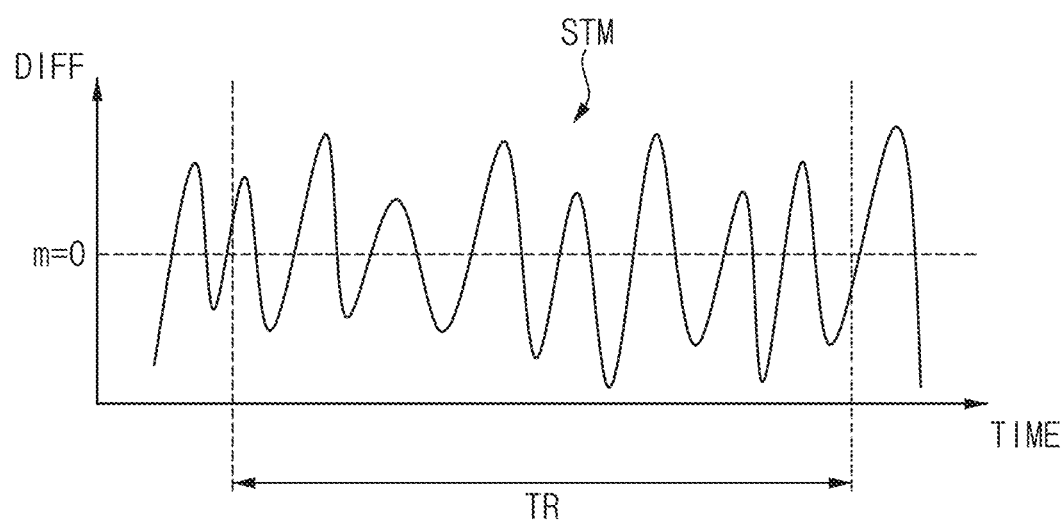

FIGS. 8A and 8B are diagrams illustrating distribution of difference values according to a degree of camera motion.

FIG. 8A illustrates the distribution of the variance DIFF, that is, the above-mentioned difference values Di when the motion of the camera module, such as hand shake, is relatively small, and FIG. 8B illustrates the distribution of the difference values Di when the motion of the camera module is relatively large. As shown in FIGS. 8A and 8B, it may be seen that the dispersion of the difference values DIFF increases as the motion of the camera module increases. As will be described below, the camera module may be considered to be in a static state STS when the dispersion (or the degree of dispersion) is smaller than a threshold value, and may be considered to be in the motion state STM when the dispersion is greater than the threshold value.

In some example embodiments, the motion level may be estimated based on the variance V of the difference values Di as shown in Expression 4.

$$V = \frac{1}{N} \sum_{i \in TP} (Di - m)^2 \qquad \text{Expression 4}$$

In Expression 4, TF represents a reference time interval (e.g., corresponding to one frame period), Di represents each difference value, m represents the average of difference values, and N represents the total number of difference values.

According to example embodiments, the aforementioned motion level may be the variance V or a standard deviation corresponding to the square root of the variance V.

Figure 9:
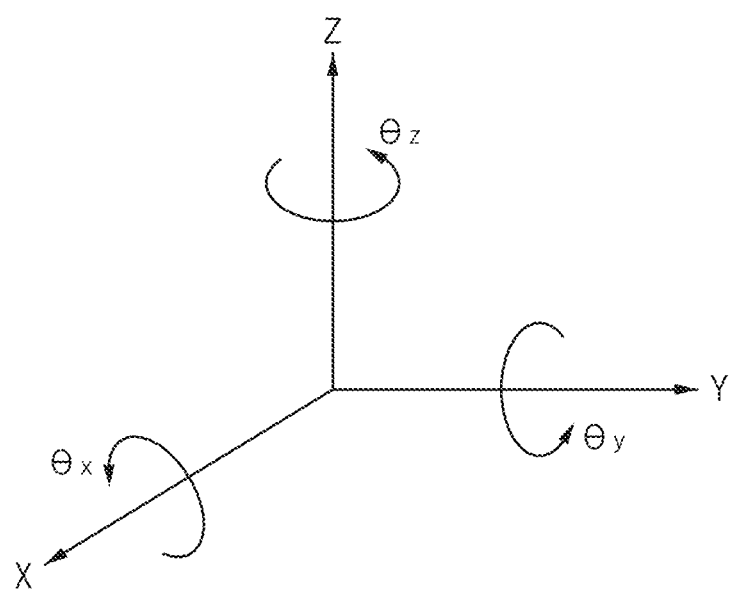
FIG. 9 is a diagram for describing an example of camera motion data of a method of image stabilization according to example embodiments.

FIG. 9 is a diagram for describing an example of camera motion data of a method of image stabilization according to example embodiments.

Referring to FIG. 9, the orientation of the camera module may be represented as combination of three angles with the X axis, Y axis, and Z axis as rotation axes, that is, roll θx, pitch θy, and yaw θz. Unlike an acceleration sensor that measures acceleration, a gyro sensor measures the three angular velocities for the roll θx, the pitch θy, and the yaw θz.

The motion sensor 30 of FIG. 1 may include a gyro sensor that provides a first angular velocity Ωx, a second angular velocity Ωy, and a third angular velocity Ωz having X, Y, and Z axes orthogonal to each other as rotational axes, respectively. The first angular velocity Ωx may be an angular velocity corresponding to the roll θx, the second angular velocity θy may be an angular velocity corresponding to the pitch θy, and the third angular velocity θz may be an angular velocity corresponding to the yaw θz. The gyro sensor is one of the motion sensors using the dynamic motion of a rotating object and is used for position measurement and direction setting, etc. The gyro sensor is used to control the posture of various devices such as smartphone, remote controller, airplane, satellite, etc.

In some example embodiments, the image size controller 60 of FIG. 1 may estimate the motion level based on the camera motion data provided from the gyro sensor using the method of FIG. 4. The image size controller 60 may calculate a first dispersion of difference values of roll values θx based on a plurality of values of the first angular velocity θx sequentially provided during the reference time interval TR, a second dispersion of difference values of pitch values θy based on a plurality of values of the second angular velocity θy that are sequentially provided during the reference time interval TR, and a third dispersion of difference values of the yaw values θz based on a plurality of values of the third angular velocity Ωz. The image size controller 60 may estimate the sum of the first dispersion, the second dispersion and the third dispersion as the motion level for determining motion information of the camera module.

In some example embodiments, as described with reference to FIGS. 4 through 9, the image size controller 60 may sequentially calculate the coordinate values and the difference values based on the camera motion data MDT, and then calculate the dispersion of the difference values.

In some example embodiments, as will be described below with reference to FIGS. 16 through 19, the image stabilizer 50 may generate the coordinate values based on camera motion data during the process of performing the electronic image stabilization (EIS). In this case, the image size controller 60 may calculate the dispersion based on the coordinate values provided from the image stabilizer 50. In other words, at least portion of the calculation for image size adjustment may be performed using a portion of the calculation for performing the EIS. In some example embodiments, an unnecessary operation may not be performed on an area of an image frame based on a detected level of motion, and thus, unnecessary power consumption may be prevented or reduced. For example, according to some example embodiments, there may be an increase in accuracy of image stabilization, power consumption, and improved field of view based on the above methods. Therefore, the improved devices and methods overcome the deficiencies of the conventional devices and methods to motion resolution, field of view, and noise removal while reducing resource consumption and increasing data clarity. For example, by using the disclosed methods, the electronic device 10 may require fewer resources, such as memory access and/or power to drive circuitry to produce an image (e.g., an output frame image OFI). Furthermore, the electronic device 10 according to example embodiments may have improved resource usage as discussed above based on a level of detected movement.

In some example embodiments, the image size controller 60 may estimate the motion level based on a dispersion of a plurality of values of the camera motion data MDT that are sequentially provided from the motion sensor 30 during a reference time interval TR before a time point when the original frame image RFI is generated. In other words, the image size controller 60 may calculate the dispersion of the values of the velocity VL as shown in FIG. 5, for example, the angular velocity values V1 to V8 during the reference time interval TR, and estimate the motion level based on the dispersion of the angular velocity values V1 to V8.

When the motion of the camera module is small, the crop margin of the EIS is not very large. In this case, the input frame image IFI may be pre-cropped to reduce processing power consumption as will be described below with reference to FIGS. 10 through 15B, and/or the output frame image OFI of the EIS may be cropped largely to reduce the loss of the field of view (FOV) as will be described below with reference to FIGS. 16 through 19.

Figure 10:
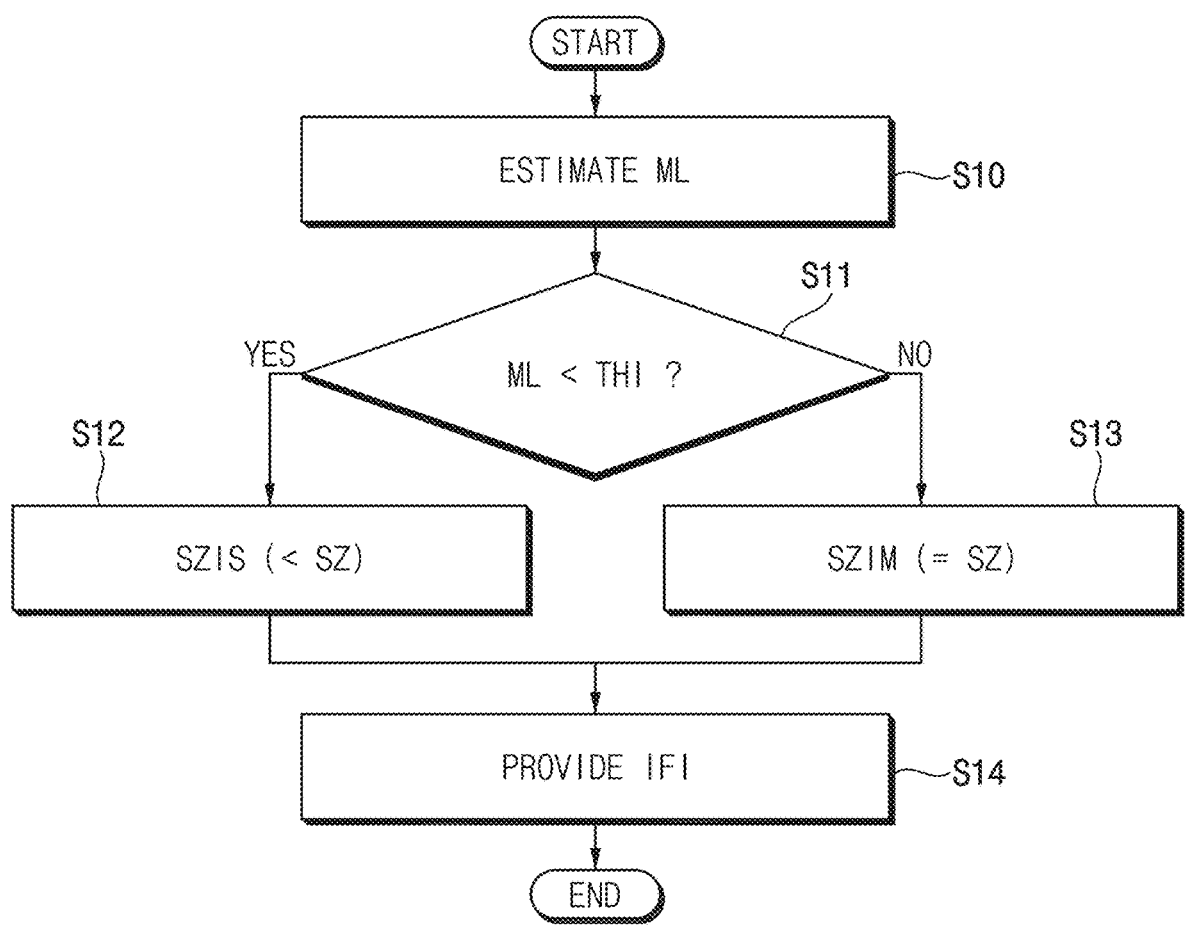
FIG. 10 is a flowchart illustrating some example embodiments of adjusting a size of an input frame image in a method of image stabilization according to example embodiments.

FIG. 10 is a flowchart illustrating some example embodiments of adjusting a size of an input frame image in a method of image stabilization according to example embodiments.

Referring to FIGS. 1 and 10, the image size controller 60 may estimate the motion level ML indicating the degree of camera motion of the camera module 20 based on the camera motion data MDT (S10). The image size controller 60 may estimate the motion level ML in the same way as described with reference to FIGS. 4 to 9, but example embodiments are not limited thereto.

The image size controller 60 may compare the motion level ML with the threshold value THI (S11), and control the size of the input frame image IFI based on the comparison result.

When the motion level ML is smaller than the threshold value THI (S11: YES), the image size controller 60 may reduce the size of the input frame image IFI to be smaller than the size SZ of the original frame image RFI (S12). When the motion level ML is smaller than the threshold value THI, the image size controller 60 may determine that the camera module 20 is in the substantially static state STS and set the size of the input frame image IFI to a static state size SZIS.

Meanwhile, when the motion level ML is greater than the threshold value THI (S11: NO), the image size controller 60 may maintain the size of the input frame image IFI to be equal to the size SZ of the original frame image RFI (S13). When the motion level ML is greater than the threshold value THI, the image size controller 60 may determine that the camera module 20 is in the motion state STM and maintain the size of the input frame image IFI as the motion state size SZIM, that is, the size SZ of the original frame image RFI.

The image signal processor 40 transfer the input frame image IFI having the size SZIS of the static state STS or the size SZIM of the motion state STM determined in this way to the image signal processor core 41 as an input (S14).

In some example embodiments, the image size controller 60 may generate a size control signal CSZ indicating the size of the input frame image IFI. The image signal processor core 41 of the image signal processor 40 may generate the input frame image IFI by cropping the original frame image RFI based on the size control signal CSZ. A method of adjusting the size of the input frame image IFI by cropping will be described below with reference to FIGS. 14, 15a and 15b.

As such, by reducing the size of the input frame image IFI according to the degree of camera motion, the amount of data processed by the image signal processor 40 may be reduced and power consumption may be reduced, for example, reduced significantly.

Figure 11:
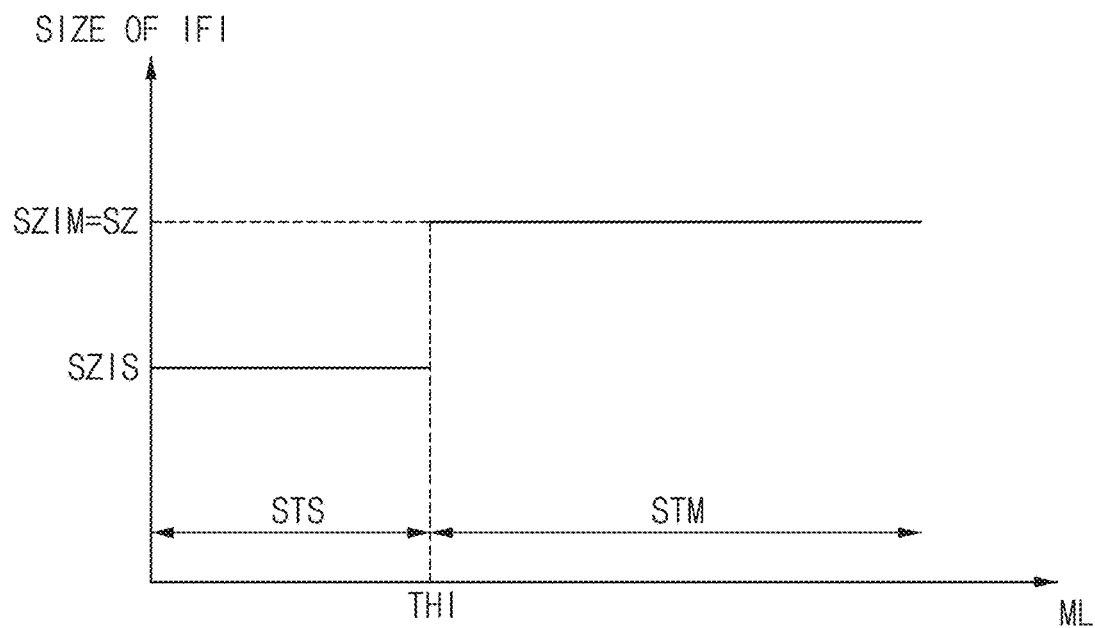
FIGS. 11, 12 and 13 are diagrams illustrating image sizes according to the method of FIG. 10.
Figure 12:
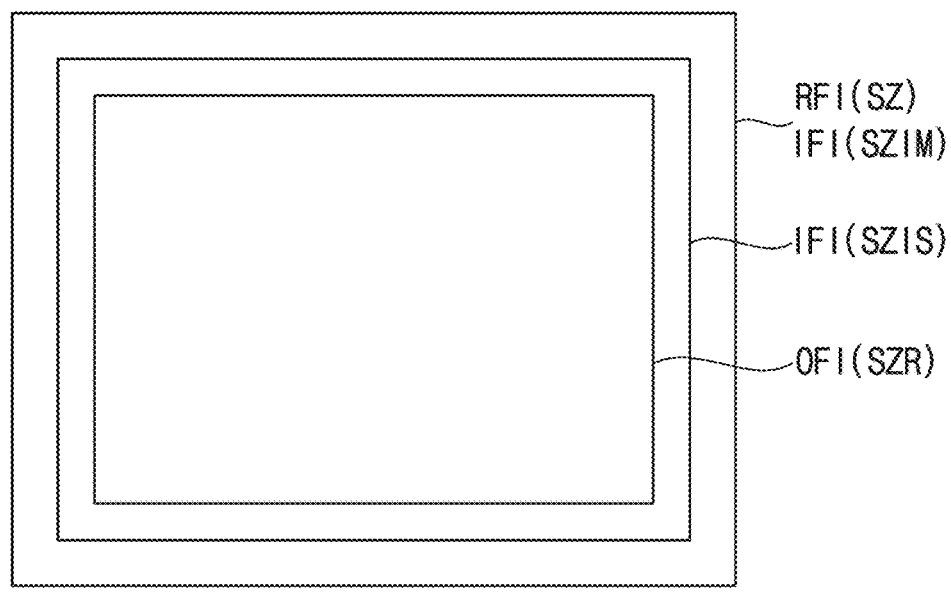
Figure 13:
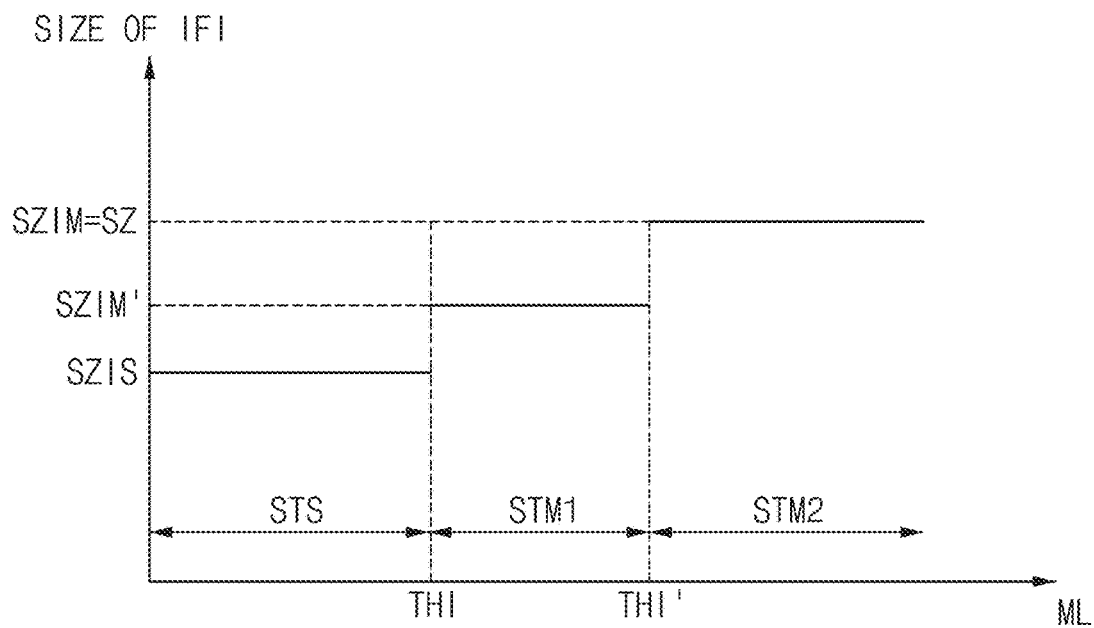

FIGS. 11, 12 and 13 are diagrams illustrating image sizes according to the method of FIG. 10.

FIG. 11 illustrates the size of the input frame image IFI according to the motion level ML determined by the method of FIG. 10, and FIG. 12 illustrates the relative sizes of images.

As illustrated in FIGS. 11 and 12, in the motion state STM where the motion level ML is greater than the threshold value THI, the size of the input frame image IFI may be set to the motion state size SZIM. On the other hand, in the static state STS where the motion level ML is smaller than the threshold value THI, the size of the input frame image IFI may be set to the static state size SZIS. The motion state size SZIM may be equal to the size SZ of the original frame image RFI, and the static state size SZIS may be smaller than the size SZ of the original frame image RFI. In some example embodiments, when the size of the input frame image IFI is controlled, the size of the output frame image OFI may be fixed to a reference size SZR regardless of the motion level ML.

FIG. 12 shows some example embodiments in which the center of the input frame image IFI of the static state size SZIS coincides with the center of the original frame image RFI. According to example embodiments, the center of the input frame image IFI of the static state size SZIS may be set not to coincide with the center of the original frame image RFI according to a crop margin of the EIS.

In some example embodiments, degree of camera motion of the camera module 20 may be divided into a plurality of motion states according to the magnitude of the motion level ML, and the size of the input frame image IFI may be changed differently for each of the plurality of motion states. For example, as shown in FIG. 13, the motion state STM of FIG. 11 may be divided into a first motion state STM1 in which the motion level ML is between the threshold value TI and the threshold value THI', and a second motion state STM2 in which the motion level ML is greater than the threshold value THI'. The first motion state STM1 corresponds to a state in which the motion of the camera module 20 is smaller than that of the second motion state STM2. In this case, the size SZIM' of the input frame image IFI in the first motion state STM1 may be set to be greater than the size SZIS of the input frame image IFI in the static state STS, and may be set to be smaller than the size SZIM of the input frame image IFI in the second motion state STM2.

Figure 14:
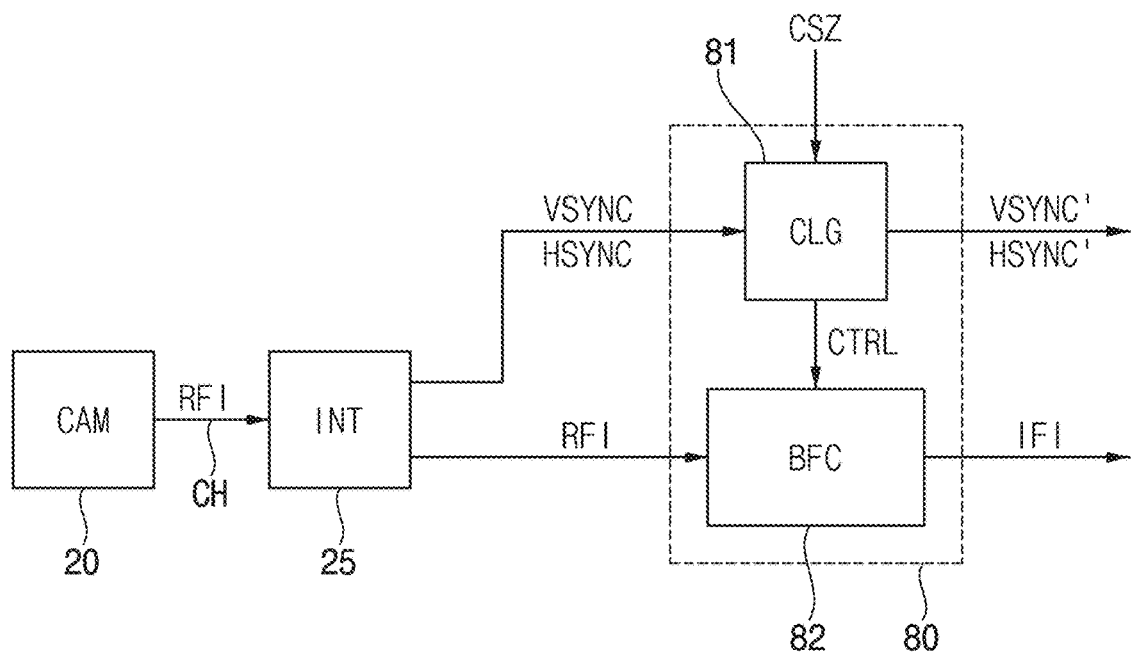
FIG. 14 is a block diagram illustrating some example embodiments of a resizing circuit configured to adjust a size of an input frame image in the method of FIG. 10.

FIG. 14 is a block diagram illustrating some example embodiments of a resizing circuit configured to adjust a size of an input frame image in the method of FIG. 10.

Referring to FIG. 14, a camera module (CAM) 20 and an interface (INT) 25 are illustrated together for convenience of description.

Referring to FIG. 14, a resizing circuit 80 may include a control logic circuit (CLG) 81 and a buffer circuit (BFC) 82. The resizing circuit 80 may be included in the image signal processor core 410 of FIG. 1 or disposed in front of the image signal processor core 41.

The resizing circuit 80 receives the original frame image RFI, crops the original frame image RFI based on the size control signal CSZ indicating the motion level ML, and outputs the input frame image IFI. The input frame image IFI output from the resizing circuit 80 may be provided to the image signal processor core 41.

The control logic circuit 81 may generate a control signal CTRL for controlling the buffer circuit 82, based on the size control signal CSZ provided from the image size controller 60, a first vertical synchronization signal VSYNC and a first horizontal synchronization signal HSYNC received through a channel CH.

The buffer circuit 82 may buffer the original frame image RFI received through the channel CH and output the input frame image IFI whose size is adjusted according to the control signal CTRL.

Also, the control logic circuit 81 may generate a second vertical synchronization signal VSYNC' and a second horizontal synchronization signal HSYNC' for the operation of the image signal processor core at a later stage.

Figure 15A:
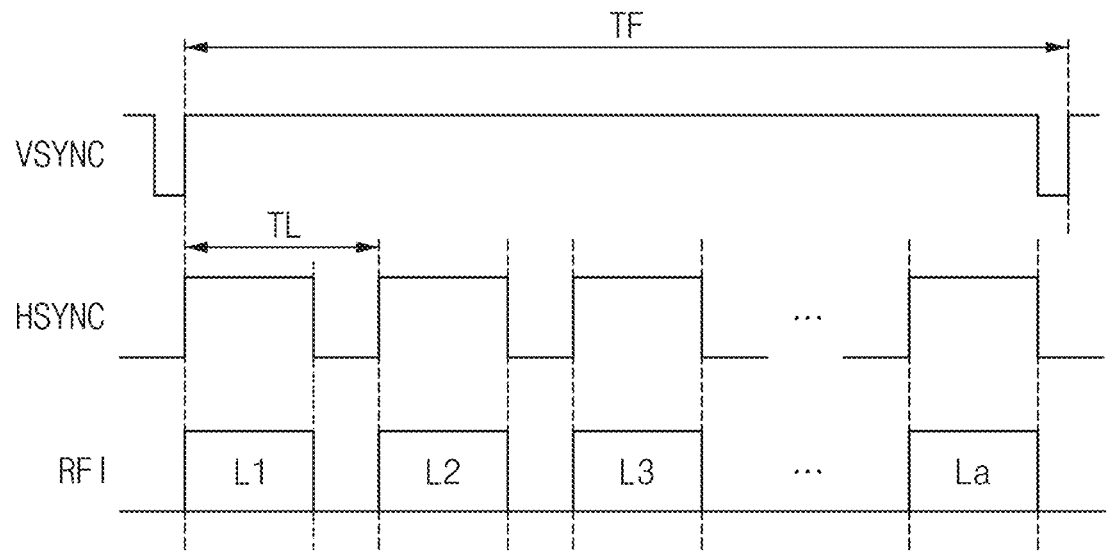
FIGS. 15A and 15B are timing diagrams illustrating operations of the resizing circuit of FIG. 14.
Figure 15B:
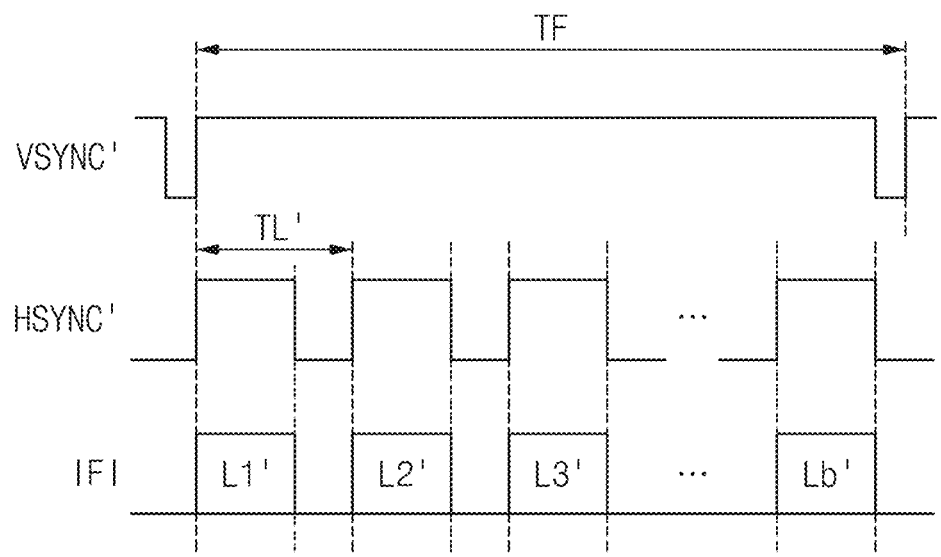

FIGS. 15A and 15B are timing diagrams illustrating operations of the resizing circuit of FIG. 14.

A vertical synchronization signal may indicate the start and end of transmission of one frame image, and a horizontal synchronization signal may indicate the start and end of transmission of one data line.

FIG. 15A illustrates data lines L1 to La included in one original frame image RFI. The first vertical synchronization signal VSYNC represents the start and end of the original frame image RFI, and the first horizontal synchronization signal HSYNC represents the start and end of the respective data lines L1 to La included in the original frame image RFI. One original frame image RFI may be transmitted during a first frame period TF and each data line may be transmitted during a first line period TL.

FIG. 15B illustrates data lines Li' to Lb' included in one input frame image IFI. The second vertical synchronizing signal VSYNC' represents the start and end of the input frame image IFI, and the second horizontal synchronizing signal HSYNC' represents the start and end of the respective data lines Li' to Lb' included in the input frame image IFI. One input frame image IFI may be transmitted during a second frame period TF' and each data line may be transmitted during a second line period TL'.

As described above, when the degree of camera motion corresponds to the static state STS, the input frame image IFI may have a size smaller than that of the original frame image RFI. In this case, the number of the data lines Li' to Lb' of the input frame image IFI and the size (number of data bits) of each data line may be reduced to be smaller than the number of the data lines L1 to La of the original frame image RFI and the size of each data line. As a result, by reducing the size of the input frame image IFI, the amount of data processed by the image signal processor core 41 may be reduced, and power consumption may be reduced, and, for example, significantly reduced.

In addition, when the degree of camera motion corresponds to the static state STS, the second frame transmission period TF' and the second line transmission period TL' of the input frame image IFI may be reduced to be smaller than the first frame transmission period TF and the first line transmission period TL of the original frame image RFI. As a result, the processing speed of the image signal processor core 41 may be improved by reducing the transmission time of the input frame image IFI.

Figure 16:
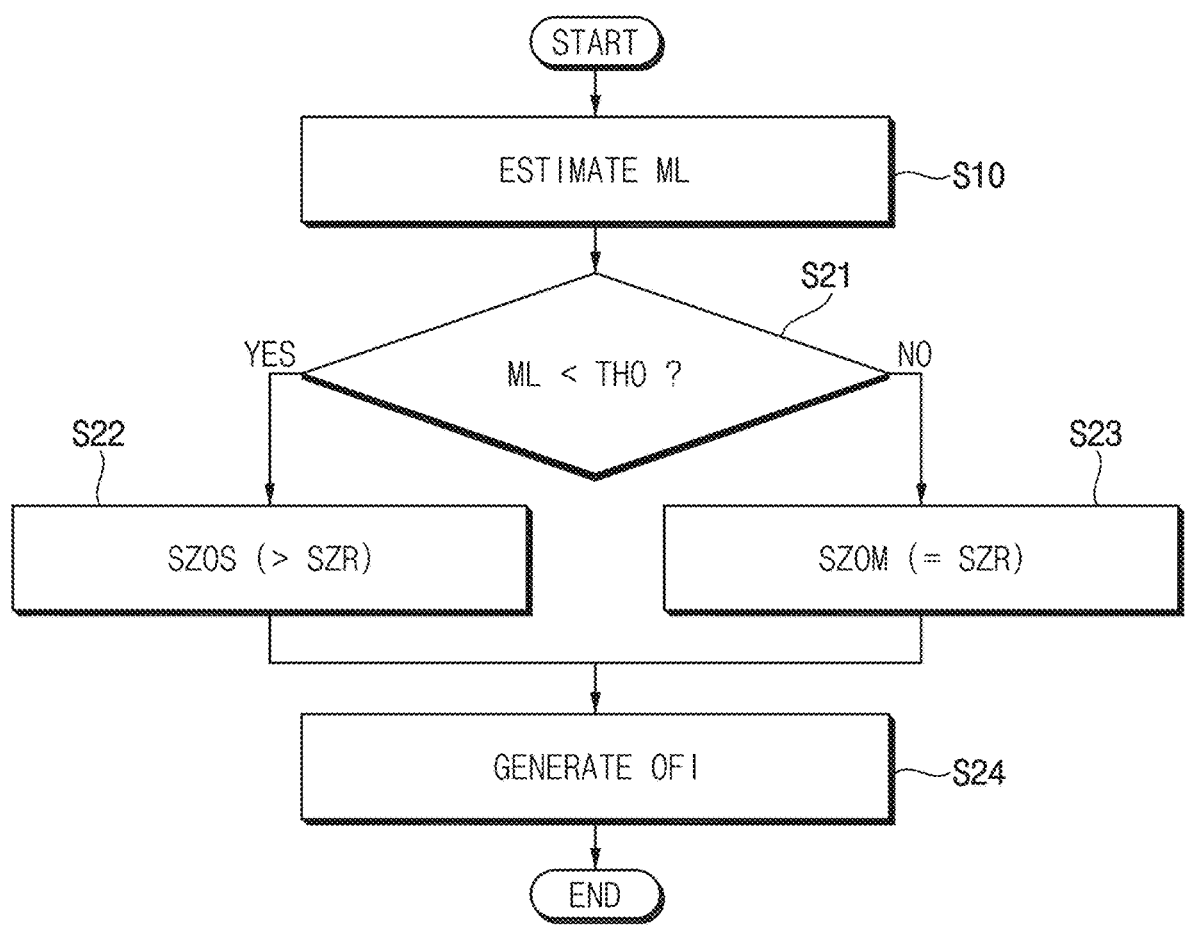
FIG. 16 is a flowchart illustrating some example embodiments of adjusting a size of an output frame image in a method of image stabilization according to example embodiments.

FIG. 16 is a flowchart illustrating some example embodiments of adjusting a size of an output frame image in a method of image stabilization according to example embodiments.

Referring to FIGS. 1 and 16, the image size controller 60 may estimate the motion level ML indicating the degree of camera motion of the camera module 20 based on the camera motion data MDT (S10). The image size controller 60 may estimate the motion level ML in the same way as described with reference to FIGS. 4 through 10, but example embodiments are not limited thereto.

The image size controller 60 may compare the motion level ML with a threshold value THO (S21) and control the size of the output frame image OFI based on the comparison result.

When the motion level ML is smaller than the threshold value THO (S21: YES), the image size controller 60 may increase the size of the output frame image OFI to be greater than a reference size SZR (S22). Here, the reference size SZR represents a size corresponding to a predetermined (or, alternatively, desired or determined) reference crop margin for the EIS performed by the image stabilizer 50 of FIG. 1. When the motion level ML is smaller than the threshold value THO, the image size controller 60 may determine that the camera module 20 is in the substantially static state STS and increased the size of the output frame image OFI to a static state size SZOS.

Meanwhile, when the motion level ML is greater than the threshold value THO (S21: NO), the image size controller 60 may maintain the size of the output frame image OFI equal to the reference size SZR (S23). When the motion level ML is greater than the threshold value THO, the image size controller 60 may determine that the camera module 20 is in the motion state STM and maintain, without increasing, the size of the output frame image OFI as the state size SZOM, that is, the reference size SZR.

The image stabilizer 50 may generate the output frame image OFI having the size SZOS of the static state STS or the size SZOM of the motion state STM determined in this way (S24). In some example embodiments, the output frame image is output for additional image processing, storage in a memory, and/or to be displayed, however, the example embodiments are not limited thereto.

In some example embodiments, the image size controller 60 may generate a size control signal CSZ indicating the size of the output frame image OFI. The image stabilizer 50 may generate the output frame image OFI by adjusting the crop margin of the EIS based on the size control signal CSZ. A method of adjusting the size of the output frame image OFI by the crop margin of the EIS will be described later.

As such, by increasing the size of the output frame image (for example, reducing the crop margin according to the degree of camera motion) the loss of the field of view accompanied with the EIS may be reduced.

Figure 17:
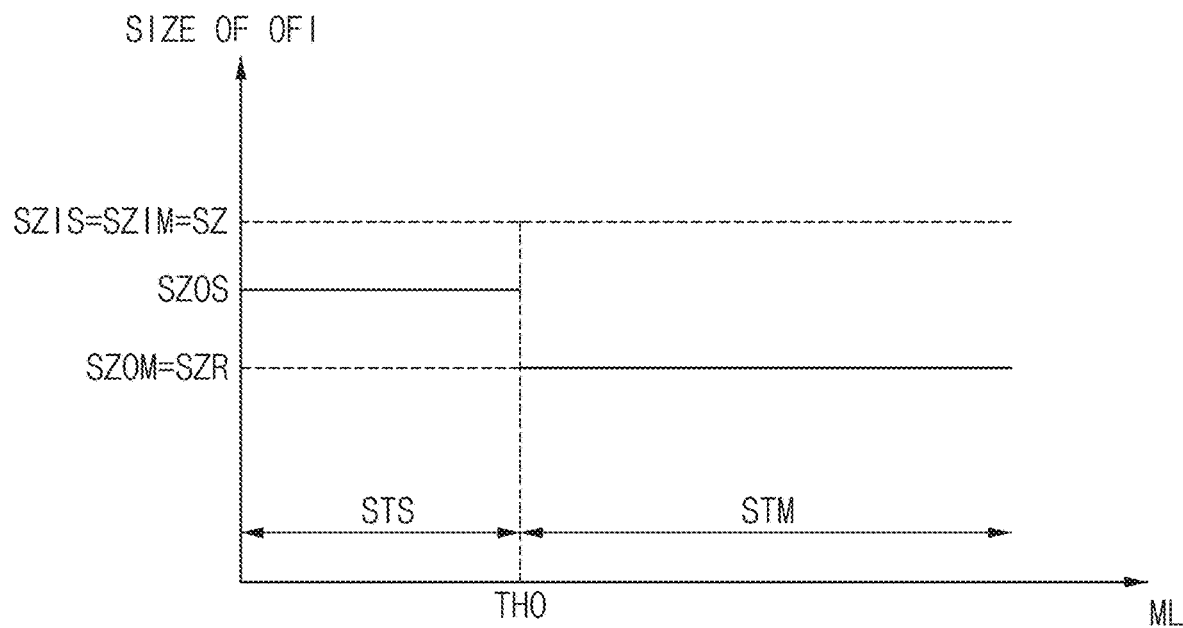
FIGS. 17, 18 and 19 are diagrams illustrating image sizes according to the method of FIG. 16.
Figure 18:
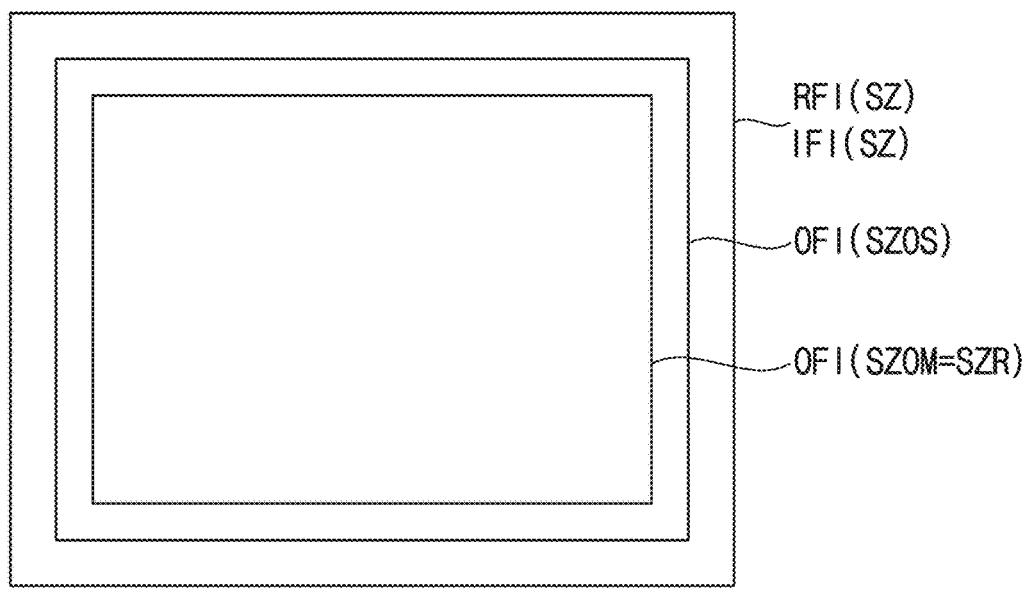
Figure 19:
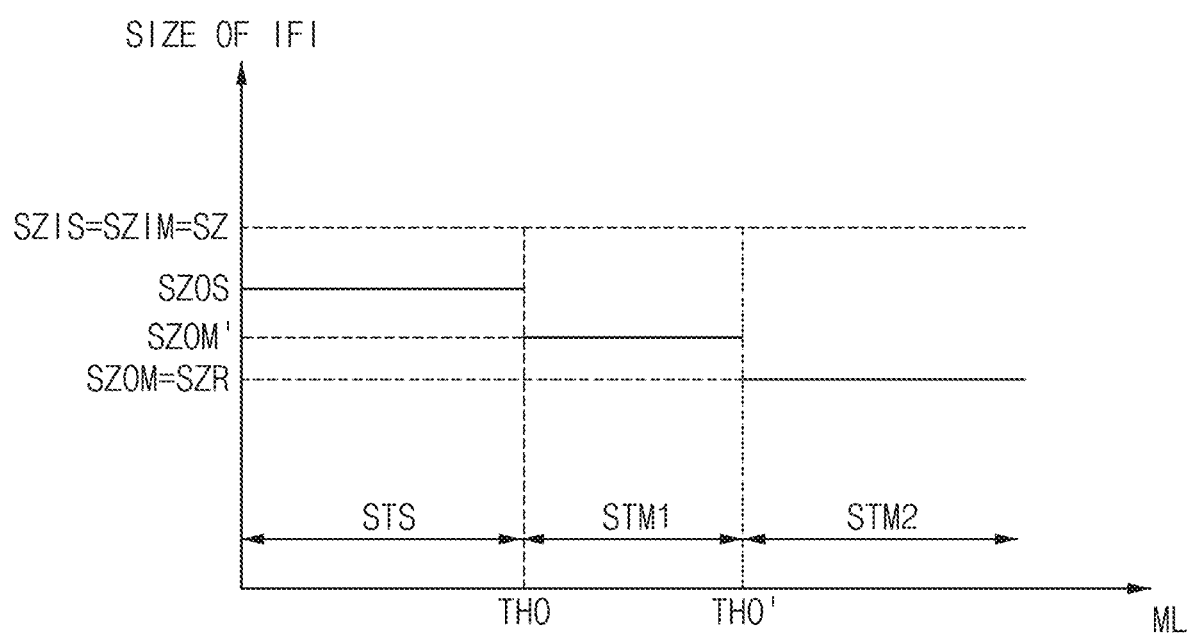

FIGS. 17, 18 and 19 are diagrams illustrating image sizes according to the method of FIG. 16.

FIG. 17 illustrates the size of the output frame image OFI according to the motion level ML determined by the method of FIG. 16, and FIG. 18 illustrates the relative sizes of images.

As illustrated in FIGS. 17 and 18, the size of the output frame image OFI may be set to the motion state size SZOM in the motion state STM where the motion level ML is greater than the threshold value THO, and the size of the output frame image OFI may be set to the static state size SZOS in the static state STS where the motion level ML is smaller than the threshold value THO. The motion state size SZOM may be equal to the reference size SZR, and the static state size SZOS may be greater than the reference size SZR. In some example embodiments, when the size of the output frame image OFI is controlled, the size of the input frame image IFI, that is, the static state size SZIS and the motion state size SZIM, may be fixed to the size SZ of the original frame image RFI regardless of the motion level ML.

In some example embodiments, the degree of camera motion of the camera module 20 may be divided into a plurality of motion states according to the magnitude of the motion level ML, and the size of the output frame image OFI may be changed differently for each of the plurality of motion states. For example, as shown in FIG. 19, the motion state STM of FIG. 17 may be divided into a first motion state STM1 in which the motion level ML is between the threshold value THO and the threshold value THO', and a second motion state STM2 in which the motion level ML is greater than the threshold value THO'. The first motion state STM1 corresponds to a state in which the motion degree of the camera module 20 is smaller than that of the second motion state STM2. In this case, the size SZOM' of the output frame image OFI in the first motion state STM1 may be set to be smaller than the size SZOS of the output frame image OFI in the static state STS, and may be set to be greater than the size SZOM of the output frame image OFI in the second motion state STM2.

As described with reference to FIGS. 1 to 19, the image stabilization method and an electronic device performing the image stabilization method according to example embodiments may perform the image stabilization efficiently by estimating the camera motion and adjusting the size of the image according to the camera motion. Power consumption may be reduced by reducing the size of the input frame image according to the degree of camera motion, and loss of the field of view may be reduced by reducing the crop margin according to the degree of camera motion.

Figure 20:
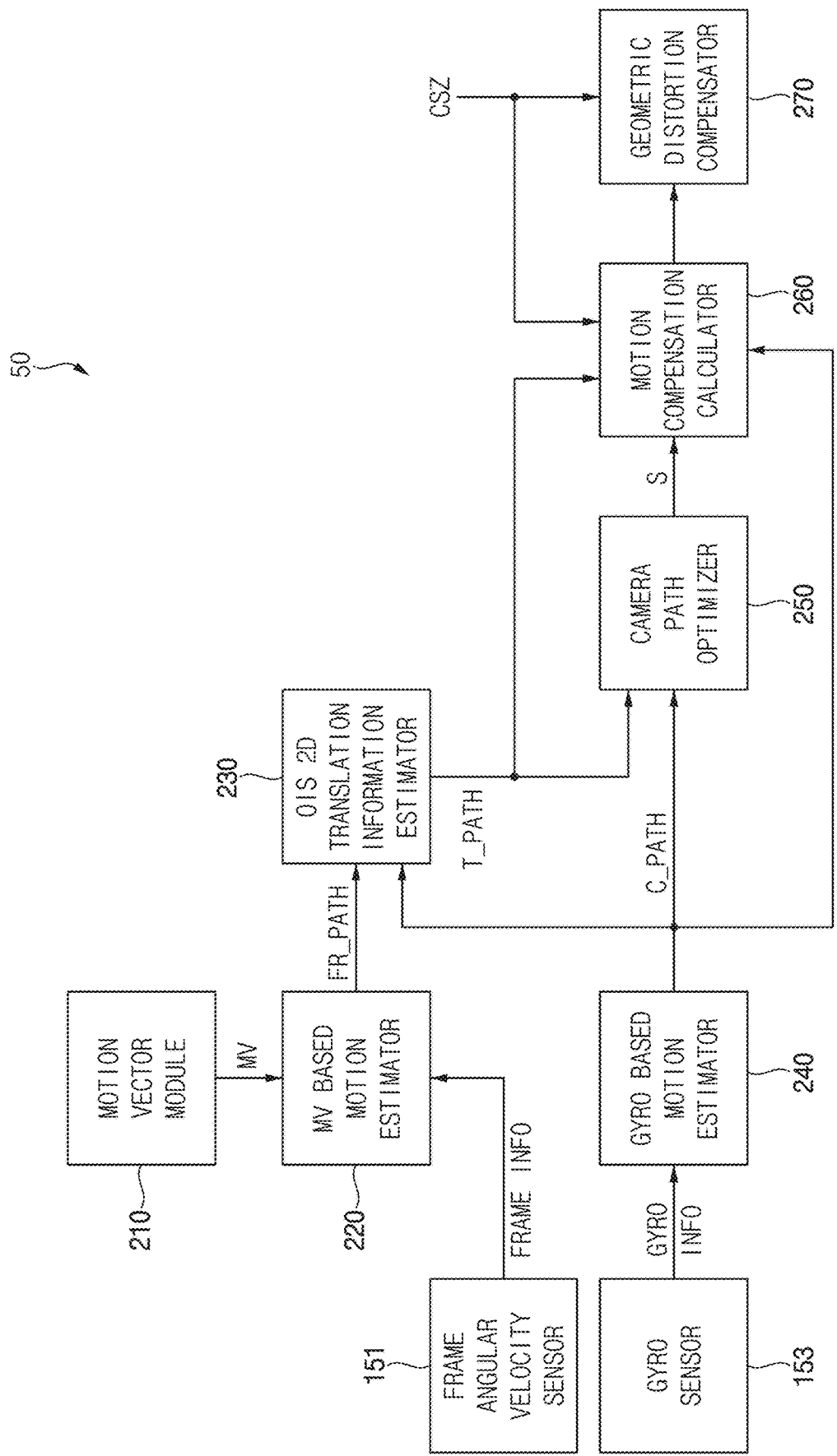
FIG. 20 is a block diagram illustrating some example embodiments of an image stabilization circuit included in an electronic device according to example embodiments.

Hereinafter, example embodiments of electronic image stabilization (EIS) performed by the image stabilizer 50 of FIG. 1 will be described below with reference to FIG. 20. Example embodiments are not limited to EIS described below, and the image stabilizer 50 may perform EIS in various ways. FIG. 20 shows some example embodiments in which both EIS and OIS are performed, but example embodiments relate to image size adjustment in the EIS, regardless of whether the OIS is performed or not.

FIG. 20 is a block diagram illustrating some example embodiments of an image stabilization circuit included in an electronic device according to example embodiments.

Referring to FIG. 20, an image stabilizer 50 includes a motion vector module 210, a motion estimator 220 based on motion vector (MV), an OIS 2D translation information estimator 230, a motion estimator 240 based on gyro, a camera path optimizer 250, a motion compensation calculator 260, and a geometric distortion compensator 270. A frame angular velocity sensor 151 and a gyro sensor 153, which may be included in a motion sensor are illustrated in FIG. 20 for convenience of description.

The frame angular velocity sensor 151 outputs frame data FRAME INFO. For example, the frame angular velocity sensor 151 may output instantaneous angular velocity information of the frame image whenever a frame time stamp is stamped at a preset (or, alternatively, desired or determined) period. The motion vector module 210 may output position change information of feature points within a frame whenever a frame stamp is stamped. An image sensor generates a frame image, and frame data generated from the frame angular velocity sensor 151 includes frame time stamp information.

The gyro sensor 153 outputs gyro data GYRO INFO. For example, the gyro sensor 153 may output instantaneous angular velocity information of the camera module itself, that is, the camera body, whenever a gyro time stamp is taken at a preset (or, alternatively, desired or determined) period. That is, the gyro data includes a gyro time stamp and location information (e.g., 3D coordinates) of the camera body.

The image stabilizer 50 receive frame rotation information FR_PATH and camera rotation information C_PATH through the frame data, the motion data, and extracts OIS 2D translation information T_Path, and optimizes the camera rotation information C_PATH by reflecting the OIS 2D translation information T_Path. Based on the optimized camera rotation information C_PATH and the OIS 2D translation information T_Path, the image stabilizer 50 outputs the digitally stabilized final image, that is, the aforementioned output frame image OFI.

In the original frame image RFI, each pixel within one frame image (for example, a first frame generated from a first frame time stamp) is sensed at different time points according to the motion of the rolling shutter, and the location information about the feature point of the same object is changed according to the position of the camera body or the rotation angle of the frame for each line. The MV-based motion estimator 220 may extract a change between such pixel position information, that is, rolling shutter information. This is referred to as intra-frame rotation information Intra_FR_Path. In addition, the final camera rotation information in each frame is extracted by accumulating and summing the inter-frame rotation information Inter_FR_Path of the camera.

According to example embodiments, the motion vector module 210 receives the frame image and the frame data and extracts motion vector information MV of the frame image, that is, motion information of the frame. The motion vector information MV may be motion information extracted from a frame image. The MV-based motion estimator 220 extracts frame rotation information FR_Path based on the frame data FRAME INFO and/or the motion vector information MV. The frame rotation information FR_Path may include the inter-frame rotation information Inter-FR_Path, the intra-frame rotation information Intra-FR_Path, and the final frame rotation information that is obtained by accumulating and summing the inter-frame rotation information Inter-FR_Path.

For example, the MV-based motion estimator 220 extracts an angle change between 'first rotation information' of the first frame generated from a first frame time stamp and 'second rotation information' of the second frame generated from a second frame time stamp, based on the frame data and the motion vector information (MV) received from the frame angular velocity sensor 151 and the motion vector module 210.

The gyro-based motion estimator 240 extracts camera rotation information based on gyro data. For example, the gyro-base motion estimator 230 compares gyro data, that is, 'first rotation information' generated from the first gyro time stamp and 'second rotation information' generated from the second gyro stamp, Position change in the 3D world coordinate system between the first gyro timestamp and the second gyro timestamp (for example, including the motion amount, motion direction, and rotational angular velocity of each of the X, Y, and Z axes) may be extracted as camera rotation information C_Path. Such camera rotation information C_Path may be provided to the image size controller 60 as coordinate values for estimating the motion level ML as described above.

The camera rotation information C_Path also includes inter-frame camera rotation information Inter-C_Path and intra-frame camera rotation information Intra-C_Path, and final camera rotation information. The final camera rotation information may be calculated by accumulating and summing inter-frame camera rotation information Inter_C_Path.

The OIS 2D translation information estimator 230 extracts OIS 2D translation information T_Path, which is information related to lens shift or sensor shift, based on frame rotation information FR_Path and the camera rotation information C_Path. The OIS 2D translation information T_Path may be information on motion of the lens assembly in the camera module on the same plane (Plane Shift) or information on motion of the image sensor on the same plane.

The OIS 2D translation information T_Path may be obtained by multiplying, for example, a difference value (e.g., an angle value) between the camera rotation information C_Path and the frame rotation information FR_Path by the focal length of the image sensor or the lens. In this case, both of inter-frame OIS 2D translation information Inter_T_Path and intra-frame OIS 2D translation information Intra_T_Path may be obtained in the same manner. (For example, Inter_T_Path=Inter_C_Path−Inter_FR_Path, and Intra_T_Path=Intra_C_Path−Intra_FR_Path.) Then, the OIS 2D translation inter-frame information (Inter_T_Path) is accumulated and summed to extract the final OIS 2D translation information.

The OIS 2D translation intra-frame information Intra_T_Path obtained here is used together with the intra-frame camera rotation information Intra_C_Path for image rolling shutter correction (for correcting pixel motion according to shutter motion).

The camera path optimizer 250 refers to the OIS 2D translation information T_Path and camera rotation information C_Path to obtain stabilized camera motion information S, which is a path along which the camera module (e.g., 100 in FIG. 3) itself has moved. The camera path optimizer 250 optimizes the camera rotation information C_Path by referring to the extracted OIS 2D translation path T_Path, the extracted intra OIS 2D translation information Intra_T_Path, and the intra camera rotation information Intra_C_Path. This optimizing operation also includes distortion correction by a rolling shutter.

When the image sensor is a CMOS sensor, the image signal processor may read out sequentially the image data from the top line to the bottom line in the pixel array while the image sensor acquires a raw image in frame units. An operation in which the image sensor reads out light in units of lines may be referred to as a rolling shutter operation.

That is, in the rolling shutter method, since the time point at which light reflected from an object enters the image sensor 201 is different for each line, image distortion may occur even within one frame due to a time difference of light. Since the distortion caused by the rolling shutter motion is caused by both camera rotation information C_Path and OIS 2D translation information T_Path, the image distortion caused by the rolling shutter operation may be corrected using the intra camera rotation information Intra_C_Path and intra OIS 2D translation information Intra_T_Path.

The motion compensation calculator 260 determines a motion compensation amount for an input frame image based on the intra-frame camera rotation information Intra_C_Path, the intra-frame OIS 2D translation information Intra_T_Path, the final OIS 2D translation information, the final camera rotation information and the stabilized camera motion information S. That is, the motion compensation calculator 260 determines the amount of correction at each individual grid point of the frame image output from the image sensor, by reflecting the rotation compensation amount corresponding to the intra-frame camera rotation information Intra_C_Path due to a rolling shutter operation, the intra-frame OIS 2D translation information Intra_T_Path and the final OIS 2D translation information.

Meanwhile, when the stabilized camera motion information S is applied to the frame image, the input pixel position of the modified frame image is calculated to exist within the range of the changed boundary margin or the crop margin.

The geometric distortion compensator 270 receives the correction amount of each grid calculated by the motion compensation calculator 260 as an input and performs the digital image stabilization by applying (for example, binning or interpolation) the received correction amount to the entire frame image output from the camera module.

According to example embodiments, the motion compensation calculator 260 and the geometric distortion compensator 270 may adjust the boundary margin or the crop margin based on the size control signal CSZ provided from the image size controller 60 as described above.

Figure 21:
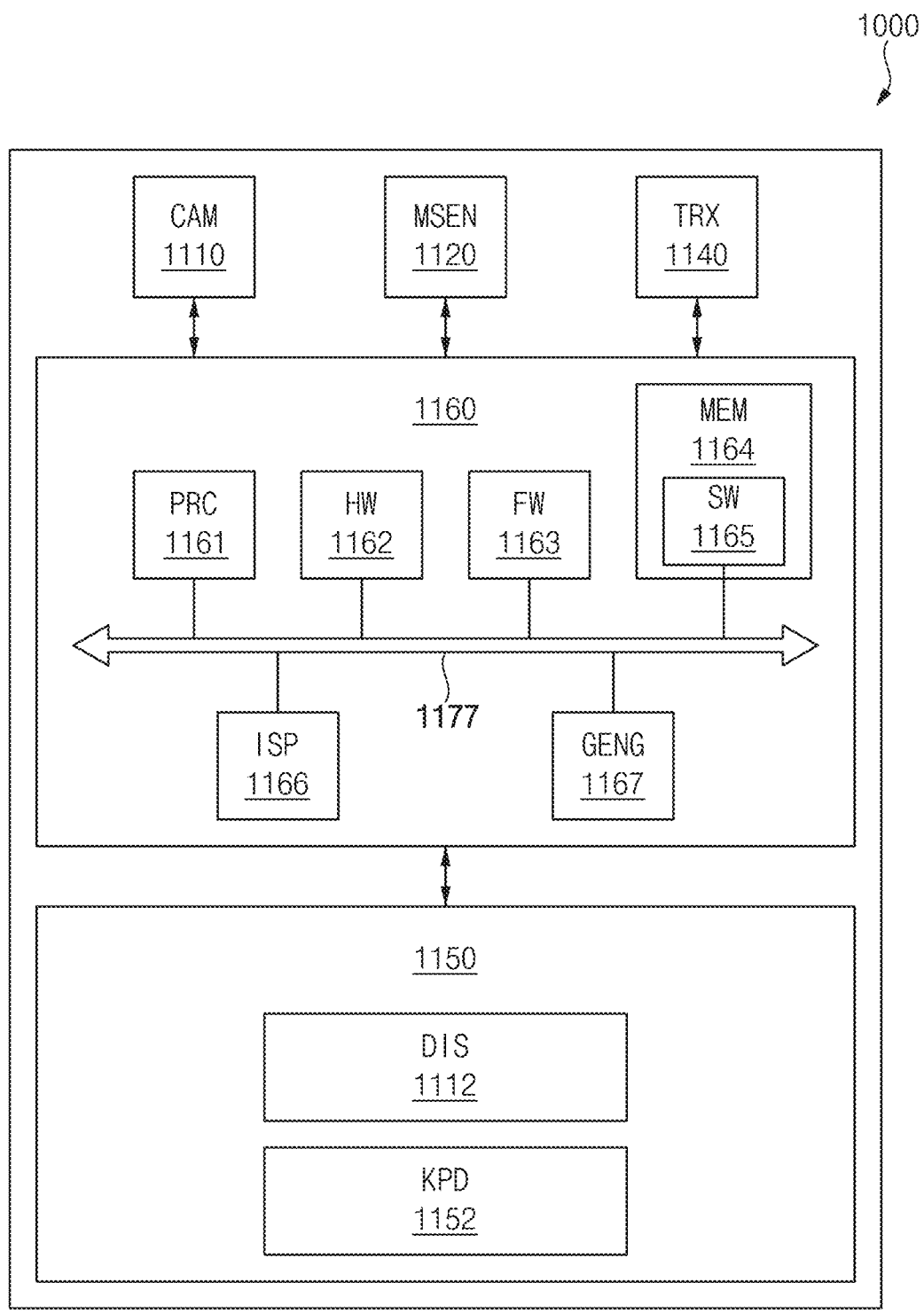
FIG. 21 is a block diagram illustrating an electronic device according to example embodiments.

FIG. 21 is a block diagram illustrating an electronic device according to example embodiments.

Referring to FIG. 21, a system 1000 includes a camera module (CAM) 1110, a motion sensor (MSEN) 1120, a transceiver (TRX) 1140, a controller 1160, and a user interface 1150.

The camera module 1110 may include at least one image sensor or at least one camera that captures and provides images. In some example embodiments, the camera module 1110 may include a plurality of cameras, and may provide images respectively captured by the plurality of cameras as a plurality of input images. In some example embodiments, the camera module 1110 may provide images sequentially captured by one camera as a plurality of input images.

The transceiver 140 may provide connectivity to another network (e.g., a wide area network, such as the Internet or a cellular network) via a wired or wireless communication link.

The user interface 1150 may include an input means (DSP) 1152 such as a keyboard or keypad, and a display (DIS) 1112 displaying an image. The keyboard or keypad 1152 may be omitted when incorporating a virtual keypad into the display 1112 with a touch screen/sensor. The display 1112 may be configured to receive the OFI (for example, as the OFI, or the OFI having been subsequently and additionally processed) and display the OFI for a user.

The controller 1116 includes a general purpose processor (PRC) 1161, hardware (HW) 1162, firmware (FW) 1163, a memory (MEM) 1164, an image signal processor (ISP) 1166, a graphics engine (GENG) 1167 and a bus 1177.

The controller 1160 may be configured to implement image size adjustment of the image stabilization method according to example embodiments. For example, the controller 1160 may be configured to implement image size adjustment functions as described above.

Example embodiments may be implemented in hardware, software, firmware or a combination thereof.

In some example embodiments, the image size adjustment of the image stabilization method may be performed by the image signal processor 1166. That is, the image size controller 60 described above may be included in the image signal processor 1166. The image stabilization method according to example embodiments may be performed by a dedicated device, or a calculation circuit included in a graphics processing unit (GPU), a neural network processing unit (NPU), an image signal processor (ISP), a digital signal processor (DSP), a CPU, or the like.

In some example embodiments, at least portion of the image stabilization method according to example embodiments may be implemented in the form of executable program instructions that cause a data processing device to process images. The program instructions may be stored in the memory 1164 in the form of software (SW) 1165, and the program instructions may be executed by the processor 1161 and/or the image signal processor 1166.

The processor 1161 includes hardware for executing instructions, such as instructions constituting a computer program. To execute instructions, the processor 1161 retrieves (or fetches) the instructions from an internal register, internal cache, or memory 1164, decodes and executes the instructions, and writes one or more results in internal registers, internal caches and/or the memory 1164.

The system 1000 may be a computer system that takes any suitable physical form. The system 1000 may include an embedded computer system, a system-on-chip (SOC), a single-board computer system (SBC) (e.g., a computer-on-chip), such as a computer-on-module (COM) or system-on-module (SOM), desktop computer system, laptop or notebook computer system, interactive kiosk, mainframe, a mesh of computer systems, a mobile phone, a personal digital assistant (PDA), a server, a tablet computer system, or a combination of two or more of these.

In this disclosure, a computer-readable storage medium or media refers to one or more semiconductor-based or other integrated circuits (ICs), for example, field-programmable gate arrays (FPGAs), application-specific ICs (ASICs), hard disk drives (HDDs), hybrid hard drives (HHDs), optical disks, optical disc drives (ODDs), magneto-optical disks, magneto-optical drives, floppy diskettes, floppy disk drives (FDDs), magnetic tapes, solid state drives (SSDs), RAM drives, SECURE DIGITAL) cards or drives, any other suitable computer-readable storage media, or any suitable combination of two or more of these. The computer-readable storage media may be volatile, non-volatile, or a combination of volatile and non-volatile.

The inventive concepts may be applied to any devices and systems performing image processing. For example, the inventive concepts may be applied to systems such as a mobile phone, a smart phone, a personal digital assistant (PDA), a portable multimedia player (PMP), a digital camera, a camcorder, a personal computer (PC), a server computer, a workstation, a laptop computer, a digital TV, a set-top box, a portable game console, a navigation system, a wearable device, an internet of things (IoT) device, an internet of everything (IoE) device, an e-book, a virtual reality (VR) device, an augmented reality (AR) device, a server system, an automotive driving system, a vehicle navigation device, a surveillance system, an auto focus system, a tracking system, a motion detection system, etc.

As described herein, any electronic devices and/or portions thereof according to any of the example embodiments may include, may be included in, and/or may be implemented by one or more instances of processing circuitry such as hardware including logic circuits; a hardware/software combination such as a processor executing software; or any combination thereof. For example, the processing circuitry more specifically may include, but is not limited to, a central processing unit (CPU), an arithmetic logic unit (ALU), a graphics processing unit (GPU), an application processor (AP), a digital signal processor (DSP), a microcomputer, a field programmable gate array (FPGA), and programmable logic unit, a microprocessor, application-specific integrated circuit (ASIC), a neural network processing unit (NPU), an Electronic Control Unit (ECU), an Image Signal Processor (ISP), and the like. In some example embodiments, the processing circuitry may include a non-transitory computer readable storage device (e.g., a memory), for example a DRAM device, storing a program of instructions, and a processor (e.g., CPU) configured to execute the program of instructions to implement the functionality and/or methods performed by some or all of any devices, systems, modules, units, controllers, circuits, architectures, and/or portions thereof according to any of the example embodiments, and/or any portions thereof.

The foregoing is illustrative of example embodiments and is not to be construed as limiting thereof. Although a few example embodiments have been described, those skilled in the art will readily appreciate that many modifications are possible in the example embodiments without materially departing from the present inventive concepts.

What is claimed is:

1. An electronic device comprising:
a motion sensor configured to generate camera motion data by sensing a motion of a camera module that captures an image to generate an original frame image;
an image signal processor core configured to generate processed frame image by processing input frame image corresponding to the original frame image;
an image stabilizer generate an output frame image by performing electronic image stabilization (EIS) of the processed frame image; and
an image size controller configured to estimate a motion level indicating a degree of camera motion of the camera module based on the camera motion data and control a size of the input frame image or a size of the output frame image based on the motion level,
calculate coordinate values indicating an orientation or a position of the camera module based on a plurality of values of the camera motion data that are sequentially provided from the motion sensor during a reference time interval before a time point based on the original frame image being generated;
calculate difference values of the coordinate values;
calculate a dispersion of the difference values; and
estimate the motion level based on the dispersion.

2. The electronic device of claim 1, wherein the image size controller is configured to reduce the size of the input frame image or reduce a crop margin of the EIS, based on the motion level being smaller than a threshold value.

3. The electronic device of claim 1, wherein the image size controller is configured to
reduce the size of the input frame image to be smaller than the size of the original frame image based on the motion level being smaller than a threshold value, and
maintain the size of the input frame image to be equal to the size of the original frame image based on the motion level being greater than the threshold value.

4. The electronic device of claim 3, wherein the image size controller is configured to fix the size of the output frame image regardless of the motion level.

5. The electronic device of claim 1, wherein the image size controller is configured to
fix the size of the output frame image to be equal to a reference size based on the motion level being greater than a threshold value, and
increase the size of the output frame image to be greater than the reference size based on the motion level being smaller than the threshold value.

6. The electronic device of claim 5, wherein the image size controller is configured to fix the size of the input frame image regardless of the motion level.

7. The electronic device of claim 1, wherein
the image stabilizer is configured to generate the coordinate values based on the camera motion data while the image stabilizer performs the EIS, and
the image size controller is configured to calculate the dispersion based on the coordinate values provided from the image stabilizer.

8. The electronic device of claim 1, wherein the image size controller is configured to estimate the motion level based on a dispersion of a plurality of values of the camera motion data that are sequentially provided from the motion sensor during a reference time interval before a time point based on the original frame image being generated.

9. The electronic device of claim 1, wherein the motion sensor includes a gyro sensor providing a first angular velocity, a second angular velocity and a third angular velocity having X, Y and Z axes orthogonal to each other as rotation axes, respectively.

10. The electronic device of claim 9, wherein the image size controller is configured to estimate, as the motion level, a sum of a dispersions of a plurality of the first angular velocity, a dispersions of a plurality of the second angular velocity and a dispersions of a plurality of the first angular velocity that are sequentially provided from the gyro sensor during a reference time interval before a time point based on the original frame image being generated.

11. The electronic device of claim 1, wherein the image size controller is configured to
classify the degree of camera motion into a plurality of motion states according to the motion level, and
change the size of the input frame image or the size of the output frame image to be different for each of the plurality of motion states.

12. The electronic device of claim 1, wherein
the image size controller is configured to generate a size control signal indicating the size of the input frame image, and
the image signal processor core is configured to generate the input frame image by cropping the original frame image based on the size control signal.

13. The electronic device of claim 1, wherein
the image size controller is configured to generate a size control signal indicating the size of the output frame image, and
the image stabilizer is configured to change a ratio of the size of the output frame image with respect to a size of the processed frame image based on the size control signal.

14. The electronic device of claim 1, further comprising:
a resizing circuit configured to receive the original frame image and output the input frame image by cropping the original frame image according to the motion level.

15. The electronic device of claim 14, wherein the resizing circuit is configured to
generate a vertical synchronization signal and a horizontal synchronization signal corresponding to the size of the input frame image, and
transfer the input frame image to the image signal processor core in synchronization with the vertical synchronization signal and the horizontal synchronization signal.

16. A method of image stabilization, comprising:
generating camera motion data by sensing a motion of a camera module that captures an image to generate an original frame image;
generating processed frame image by processing input frame image corresponding to the original frame image;
generating an output frame image by performing electronic image stabilization (EIS) of the processed frame image;
estimating a motion level indicating a degree of camera motion of the camera module based on the camera motion data;
controlling a size of the input frame image or a size of the output frame image based on the motion level;
calculating coordinate values indicating an orientation or a position of the camera module based on the camera motion data sequentially provided during a reference time interval before a time point based on the original frame image being generated;

calculating difference values of the coordinate values;
calculating a dispersion of the difference values; and
estimating the motion level based on the dispersion.

17. The method of claim 16, wherein controlling the size of the input frame image or the size of the output frame image includes:
reducing the size of the input frame image or reducing or a crop margin of the EIS based on the motion level being smaller than a threshold value.

18. A method of image stabilization, comprising:
estimating a motion level indicating a degree of camera motion of a camera module based on camera motion data generated by a motion sensor, the camera module capturing an image to generate an original frame image;
controlling, based on the motion level, a size of an input frame image that is input to an image signal processor core or a size of an output frame image that is generated by electronic image stabilization (EIS);
calculating coordinate values indicating an orientation or a position of the camera module based on a plurality of values of the camera motion data that are sequentially provided from the motion sensor during a reference time interval before a time point based on the original frame image being generated;
calculating difference values of the coordinate values;
calculating a dispersion of the difference values; and
estimating the motion level based on the dispersion.

* * * * *